US011247347B2

(12) United States Patent
Wellman et al.

(10) Patent No.: US 11,247,347 B2
(45) Date of Patent: Feb. 15, 2022

(54) LINKAGE SYSTEM FOR PREHENDING OBJECTS USING IMPACTIVE FORCES

(71) Applicant: Amazon Technologies, Inc., Seattle, WA (US)

(72) Inventors: Parris S. Wellman, Reading, MA (US); Beth A. Marcus, Bedford, MA (US); Gregory Coleman, Somerville, MA (US); Manikantan Nambi, Malden, MA (US); Erica Aduh, Cambridge, MA (US); Timothy G. Dietz, Reading, MA (US); Leonard Thomas Lilliston, III, Sudbury, MA (US); Margaret Jean Williams George, Cambridge, MA (US); Jonas Eichenberger, Zürich (CH); Mathias Moser, Zürich (CH); Dominique Ernst, Zürich (CH); Ueli Schlaepfer, Affoltern am Albis (CH)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 16/799,600

(22) Filed: Feb. 24, 2020

(65) Prior Publication Data
US 2021/0086372 A1 Mar. 25, 2021

Related U.S. Application Data

(60) Provisional application No. 62/952,999, filed on Dec. 23, 2019, provisional application No. 62/903,500, filed on Sep. 20, 2019.

(51) Int. Cl.
*B25J 15/00* (2006.01)
*B25J 15/06* (2006.01)
(Continued)

(52) U.S. Cl.
CPC ......... *B25J 15/0683* (2013.01); *B25J 9/0015* (2013.01); *B25J 9/123* (2013.01); *B25J 9/1612* (2013.01)

(58) Field of Classification Search
CPC ...... B25J 15/0683; B25J 9/1612; B25J 9/123; B25J 9/0015; B25J 15/08; B25J 15/0491
(Continued)

(56) References Cited

U.S. PATENT DOCUMENTS 3,147,872 A 9/1964 Olson
3,227,482 A 1/1966 Harris
(Continued)

FOREIGN PATENT DOCUMENTS

DE 1204140 B 10/1965
DE 102010043036 A1 5/2012
(Continued)

OTHER PUBLICATIONS

U.S. Appl. No. 16/899,885, "Varying Strength Interface System for Robotic End-Effector", filed Jun. 12, 2020.
(Continued)

*Primary Examiner* — Paul T Chin
(74) *Attorney, Agent, or Firm* — Patterson + Sheridan, LLP

(57) ABSTRACT

Aspects described herein include an end effector capable of prehending items using impactive and astrictive forces. The end effector includes an interface system having a deformable mounting plate and a pliable body member attached to the mounting plate. The end effector further includes a linkage system between a plurality of actuators and the interface system. The linkage system connects to lateral portions of the mounting plate.

24 Claims, 20 Drawing Sheets

(51) Int. Cl.
*B25J 9/16* (2006.01)
*B25J 9/12* (2006.01)
*B25J 9/00* (2006.01)

(58) Field of Classification Search
USPC .................................................. 294/183, 185
See application file for complete search history.

(56) References Cited

U.S. PATENT DOCUMENTS

| | | | |
|---|---|---|---|
| 3,734,325 A | 5/1973 | Stone | |
| 4,961,606 A | 10/1990 | Nilsson | |
| 5,344,202 A | 9/1994 | Ramler et al. | |
| 5,791,861 A | 8/1998 | Seelig | |
| 5,984,623 A | 11/1999 | Smith et al. | |
| 6,561,744 B2 | 5/2003 | Liang | |
| 8,251,415 B2 | 8/2012 | Lomerson, Jr. | |
| 8,525,955 B2 | 9/2013 | Long | |
| 10,625,428 B2 | 4/2020 | Coleman et al. | |
| 10,639,790 B1* | 5/2020 | Bacon | B65B 57/14 |
| 10,913,165 B1* | 2/2021 | Jonas | B25J 15/0683 |
| 10,926,403 B1* | 2/2021 | Asokan | B25J 9/1005 |
| 11,077,564 B1* | 8/2021 | Polido | B25J 15/0052 |
| 11,084,175 B2* | 8/2021 | Polido | B25J 15/0061 |
| 2006/0043747 A1 | 3/2006 | Kniss | |
| 2008/0187428 A1 | 8/2008 | Murry | |
| 2009/0320417 A1 | 12/2009 | Gilmore | |
| 2012/0207574 A1 | 8/2012 | La Rovere et al. | |
| 2014/0037413 A1 | 2/2014 | Takashima et al. | |
| 2015/0375401 A1 | 12/2015 | Dunkmann et al. | |
| 2016/0096277 A1* | 4/2016 | Noriyuki | G01D 5/30 294/185 |
| 2016/0214812 A1 | 7/2016 | Johnson | |
| 2017/0291307 A1* | 10/2017 | Davi | B25J 15/0052 |
| 2019/0084012 A1 | 3/2019 | McCoy, Jr. et al. | |
| 2019/0389081 A1 | 12/2019 | Coleman et al. | |
| 2020/0122317 A1* | 4/2020 | Zaffaroni | F16B 5/0621 |
| 2021/0094766 A1* | 4/2021 | Ikeya | B25J 15/0683 |

FOREIGN PATENT DOCUMENTS

| | | |
|---|---|---|
| DE | 102013208778 A1 | 11/2014 |
| DE | 102015107394 A1 | 11/2016 |
| DE | 102015210316 A1 | 12/2016 |
| DE | 102016115102 A1 | 2/2018 |
| DE | 102016011618 A1 | 3/2018 |

OTHER PUBLICATIONS

German Office Action for Application No. 102020005752.7 dated Jun. 23, 2021.
Great Britain Intellectual Property Office Search Report for Application No. GB2014553.8 dated Mar. 17, 2021.
German Patent and Trademark Office, Examination Report for Application 112019003240.4, dated Sep. 28, 2021.

* cited by examiner though it may be monolithic or may comprise a plurality of sections that are dimensioned and arranged in such a manner that a vacuum may be formed and maintained between the pliable body member 125 and the item to be suctioned. The pliable body member 125 may have any suitable shape that defines the inner recess 135, such as an annular disk, a bellows suction cup, and so forth.

Although shown as being a continuous shape, in some cases the pliable body member 125 may define one or more

LINKAGE SYSTEM FOR PREHENDING OBJECTS USING IMPACTIVE FORCES

CROSS-REFERENCE TO RELATED APPLICATIONS

This application is related to U.S. patent application Ser. No. 16/018,748, filed Jun. 26, 2018. This application also claims domestic benefit of U.S. provisional patent application Ser. Nos. 62/903,500 filed Sep. 20, 2019 and 62/952,999 filed Dec. 23, 2019. Each of the aforementioned patent applications is herein incorporated by reference in its entirety.

BACKGROUND

The present disclosure relates to prehending items using an end effector, and more specifically, to implementations of an end effector having a linkage system capable of applying impactive force to the items.

BRIEF DESCRIPTION OF DRAWINGS

Various embodiments in accordance with the present disclosure will be described with reference to the drawings, where like designations denote like elements.

DETAILED DESCRIPTION

While conventional suction-based end effectors may be effective at moving items having relatively large planar surfaces, the ability to move items without suctioning a single planar surface (e.g., an item lacking a planar surface, an item having a planar surface that is inaccessible in a particular orientation of the item relative to the end effector, and so forth) remains a technical challenge. Further, suctioning may be difficult or entirely unsuitable for certain types of items, such as those having porous surfaces (e.g., a wire or woven basket) causing suction force to be lost.

According to embodiments described herein, an end effector comprises an interface system having a deformable plate, and a linkage system connected with lateral portions of the deformable plate, such that applying force(s) to the linkage system causes the deformable plate to deform. In some cases, deforming the deformable plate causes the end effector to apply an impactive force to an item.

In some embodiments, the interface system further comprises a pliable body member with a sealing surface. The pliable body member at least partly defines an inner recess in fluid communication with a vacuum port. In some cases, deforming the deformable plate alters a geometry of the sealing surface, such that the sealing surface is more closely aligned with a geometry of the item to form an improved seal with the item. Further, at least one component of the linkage system may be rotatable to allow the deformable plate to rotate relative to other components of the end effector, such that the sealing surface is more closely aligned with the geometry of the item. In some embodiments, the end effector prehends the item using both impactive (e.g., gripping) and astrictive (e.g., suctioning) forces.

Using the various implementations of the end effector enables items with complex and/or irregular shapes to be manipulated at greater velocities and/or accelerations without a loss of suction and/or without damaging the items. For example, altering the geometry of the sealing surface may allow a small item to be selectively picked from among multiple small items. Further, the linkage system may be located close to the deformable plate and/or the pliable body member, which reduces the overall size of the end effector and permits the end effector to reach items having a reduced or restricted accessibility. In one example, an item may be located in a corner of a tote, such that the walls of the tote may interfere with the end effector as it approaches the item. In another example, an item may have a difficult orientation, such as a book lying flat on the bottom of a tote where the spine of the book is the target contact region for the end effector.

Figure 1A:
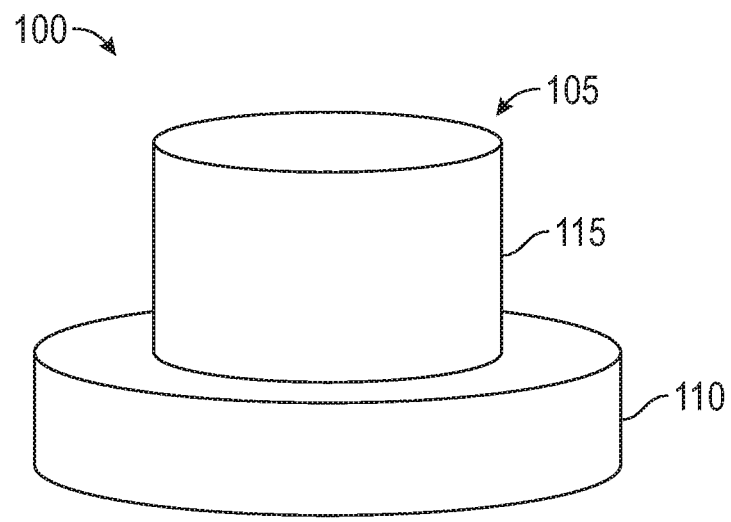
FIGS. 1A and 1B are diagrams of an exemplary end effector, according to various embodiments.
Figure 1B:
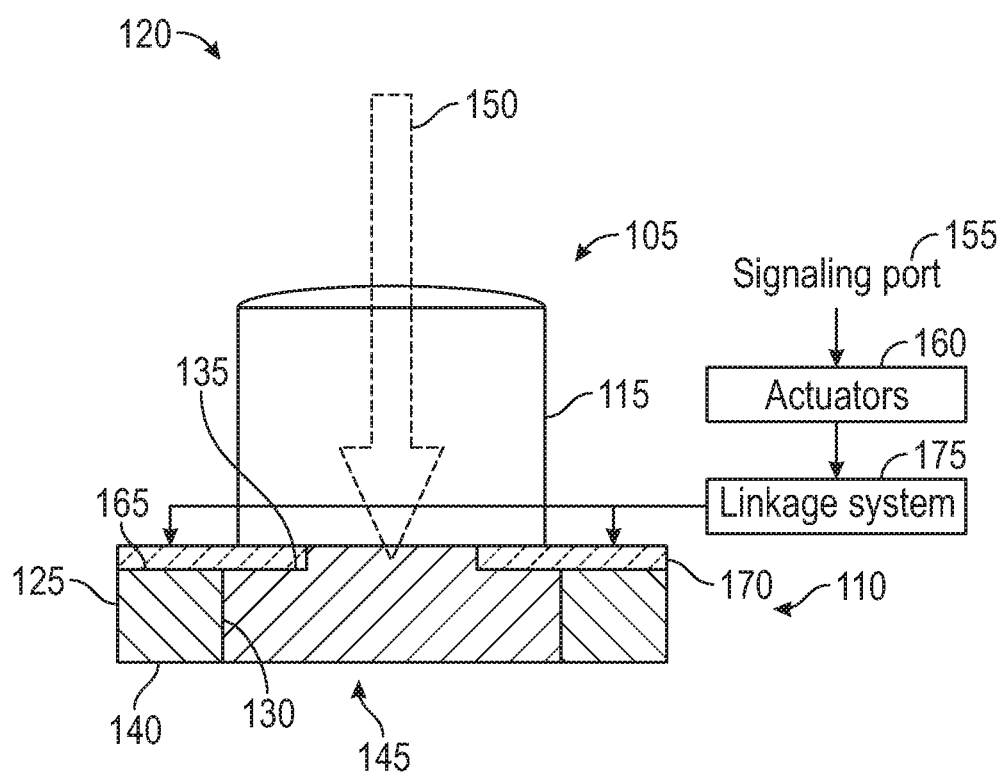

FIGS. 1A, 1B are diagrams 100, 120 of an exemplary end effector 105, according to various embodiments. More specifically, the diagram 100 represents an exterior view of the end effector 105, and the diagram 120 represents a cross-sectional view of the end effector 105. The end effector 105 may be used within an industrial automation system or any alternate environment suitable for prehending and moving items.

The end effector 105 comprises an interface system 110 attached to a manifold 115. The interface system 110 comprises a pliable body member 125 (or "body member") made of any pliable material(s) suitable for forming a seal with a contacting item and maintaining a vacuum. In some embodiments, the pliable body member 125 comprises a suitable closed cell or open cell foam. Some non-limiting examples of pliable materials include polymeric foams such as nitrile rubber foam, polyurethane foam, silicon foam, polychloroprene foam (neoprene), and so forth. Other non-limiting examples of pliable materials include elastomeric materials such as latex, rubber, and silicone.

The pliable body member 125 comprises an inner surface 130 defining an inner recess 135 (also referred to as a "region", a "central region", or a "vacuum region"). The pliable body member 125 may be monolithic or may comprise a plurality of sections that are dimensioned and arranged in such a manner that a vacuum may be formed and maintained between the pliable body member 125 and the item to be suctioned. The pliable body member 125 may have any suitable shape that defines the inner recess 135, such as an annular disk, a bellows suction cup, and so forth.

Although shown as being a continuous shape, in some cases the pliable body member 125 may define one or more gaps that accommodate the movement of material of the pliable body member 125 during deformation thereof. For example, the gaps may extend radially from a center of the pliable body member 125, and in some cases may be arranged relative to known locations where force is applied to deform the interface system 110. The one or more gaps are dimensioned such that only a minor amount of suction force is lost when the pliable body member 125 is in an undeformed state. Further, the one or more gaps may be partially or fully closed as material from the pliable body member 125 moves during deformation. In some cases, the pliable body member 125 may define one or more perforations that accommodate the movement of material of the pliable body member 125 during deformation thereof.

The pliable body member 125 may be configured to entirely circumscribe the inner recess 135. In some embodiments, when the pliable body member 125 is in an undeformed state, the inner surface 130 and/or the inner recess 135 have elliptical shapes, such as an ellipse or a circle. When viewed from a top view, the manifold 115 and the interface system 110 may have elliptical shapes that are concentric and not coextensive. However, other suitable shapes, sizes, coextensive, and/or non-concentric arrangements of the manifold 115 and the interface system 110 are also possible.

The pliable body member 125 further comprises a sealing surface 140 at a distal end of the pliable body member 125. The distal end of the pliable body member 125, at which items may be contacted and/or suctioned to the end effector 105, may correspond to a distal end of the end effector 105. The sealing surface 140 defines an opening 145 to the inner recess 135. In some embodiments, bringing an item into proximity with the sealing surface 140 causes the sealing surface 140 to conform to a contour of the item and thereby seals the inner recess 135 from ambient. In some cases, bringing the item into proximity with the sealing surface 140 comprises contacting the item to the sealing surface 140. In other cases, bringing the item into proximity with the sealing surface 140 comprises bringing the item close to (although not contacting) the sealing surface 140. As discussed herein, forming a seal with an item (e.g., contacting the item to the sealing surface 140) does not strictly require that all suction force be maintained. It is contemplated that a minor amount of suction force may be lost while the end effector 105 suctions the item, so long as the maintained suction force is sufficiently large to withstand inertial forces that are expected when moving the item.

In some embodiments, the interface system 110 further comprises a mounting plate 170 to which the pliable body member 125 is attached. The mounting plate 170 may have any suitable implementation for pivoting and/or deforming responsive to applied forces. For example, the mounting plate 170 may be formed as a pivotable plate having one or more pivot axes. Some exemplary implementations of the mounting plate 170 are described in U.S. patent application Ser. No. 16/018,748, which is herein incorporated by reference in its entirety.

In some embodiments, the mounting plate 170 pivots and/or deforms to further control a shape and/or sizing of the suction area presented by the end effector 105. In some embodiments, the mounting plate 170 pivots and/or deforms such that the end effector 105 provides impactive forces (e.g., gripping) in addition to the astrictive forces (e.g., suction) provided by the vacuum.

In some embodiments, the mounting plate 170 has a greater rigidity than the pliable body member 125, and may be formed of different material(s) and/or differently dimensioned. For example, the greater rigidity of the mounting plate 170 may allow one or more actuators 160 to, via a linkage system 175, deform the pliable body member 125 without causing substantial wear or damage thereto. In one embodiment, the mounting plate 170 comprises a rubber material, but other types of pliable materials are also possible. In some alternate embodiments, the mounting plate 170 may be rigid, such that application of the vacuum and/or the compressed gas does not cause the mounting plate 170 to deform.

In some alternate implementations, the one or more actuators 160 may contact and deform the pliable body member 125 without an intermediate mounting plate 170.

The pliable body member 125 may be attached to the mounting plate 170 using any suitable techniques. In some embodiments, the pliable body member 125 is attached to the mounting plate 170 using one or more of an adhesive layer, a glue, and a fabric. In some embodiments, the pliable body member 125 is attached to a flexible backing plate, and the flexible backing plate is then attached to the mounting plate 170 (e.g., via adhesive layer, glue, and/or fabric).

In some embodiments, the mounting plate 170 defines one or more openings extending therethrough. For example, the mounting plate 170 may define a first opening through which the vacuum port 150 is in fluid communication with the inner recess 135. As shown in the diagram 120, the first opening may be centrally located (e.g., aligned with a central axis of the end effector 105). However, other implementations of the mounting plate 170 (e.g., a different number of openings) are also contemplated.

In some embodiments, the force applied by the one or more actuators 160 via the linkage system 175 to the mounting plate 170 causes the mounting plate 170 to move (for example, to pivot and/or deform). In some embodiments, the applied force deforms the pliable body member 125, which alters a geometry of the sealing surface 140. In some embodiments, the applied force alters a relative orientation of different sealing surfaces 140 of the interface system 110.

The one or more actuators 160 may be of any suitable type(s). For example, the one or more actuators 160 may be actuatable according to any suitable means, such as pneumatic, hydraulic, mechanical, motorized, and so forth. Further, the one or more actuators 160 may comprise active and/or passive actuators. Some non-limiting examples of the one or more actuators 160 include linear actuators and rotary actuators. In one embodiment, the one or more actuators 160 comprise one or more linear actuators attached to the interface system 110, and deforming the interface system 110 comprises increasing a length of the one or more linear actuators.

In some embodiments, the pliable body member 125 in an undeformed state has a surface 165 defined within a plane at a proximal end opposite the distal end. Stated another way, a proximal surface of the pliable body member 125 may be within a single plane in the undeformed state, regardless of the overall shape or dimensioning of the pliable body member 125. Conventional implementations of the pliable body member 125 (e.g., a foam suction cup) may be configured to maintain the surface 165 within the plane during operation (e.g., rigidly attached and not permitted to deform), which limits the ability of the foam suction cup to suction to irregular, complex, and/or heavy items. In such a case, the performance of the conventional foam suction cup to prehend items is based solely on the compliance of the foam.

In some embodiments, the one or more actuators 160 may be used to apply force to the pliable body member 125 at the surface 165 via the linkage system 175 and the mounting plate 170. In this way, one or more degrees of freedom are provided to manipulate the pliable body member 125, which permits the pliable body member 125 to be dynamically shaped to more closely match a surface geometry of an item to be suctioned. This increases the compatibility of the pliable body member 125 with different types of items having irregular or complex geometries. This also increases the quality of the seal formed with a suctioned item, allowing heavier items to be moved and/or the items to be moved more rapidly.

The linkage system 175 may have any suitable implementation for transferring forces provided by the one or more actuators 160 to the pliable body member 125. The links of the linkage system 175 are formed of material(s) having suitable strength for transferring the forces from the one or more actuators 160 to deform the mounting plate 170 and the pliable body member 125. For example, the links may be formed of metals such as stainless steel, composite or reinforced plastics, ceramics, and so forth. In some embodiments, the linkage system 175 connects to the interface system 110 at lateral portions of the mounting plate 170.

The linkage system 175 defines a plurality of joints at which the links are connected. In some embodiments, the joints comprise pivots that permit relative rotary motion of connected links. However, a linkage system 175 comprising other type(s) of joints such as sliders are also contemplated. In some embodiments, one or more links of the linkage system 175 are connected with static structural member(s) of the end effector 105 and permitted to rotate relative thereto.

As discussed above, deforming the mounting plate 170 alters a geometry of the sealing surface 140 of the pliable body member 125, which enables an improved seal to be formed with an item. In some embodiments, the links of the linkage system 175 are dimensioned and the joints arranged such that application of force(s) by the one or more actuators 160 cause the pliable body member 125 to deform to an extent that the linkage system 175 provides an impactive force (e.g., gripping) to an item through the pliable body member 125. Thus, the end effector 105 is capable of prehending items using impactive and astrictive (e.g., suction) forces.

In some embodiments, at least one component of the linkage system 175 may be rotatable, which allows the mounting plate 170 and the pliable body member 125 to rotate relative to other components of the end effector 105. In this way, the end effector 105 may be capable of self-aligning with an item, which allows the sealing surface 140 to more closely aligned with the geometry of the item.

The manifold 115 may represent a continuously rigid portion of the end effector 105, and may be used to interface with other components of the industrial automation system. For example, one or more mechanical arms for spatially manipulating the end effector 105 (e.g., displacing and/or rotating) may be attached to the manifold 115. In another example, the manifold 115 may provide points of attachment to the end effector 105, e.g., such as attaching hoses to the vacuum port 150 and the compressed gas port 180 and/or attaching a cable, hose, etc. to the signaling port 155.

The manifold 115 may be formed of any suitable material(s), which may include relatively inelastic material(s) such as plastics or metals. However, in some cases, the manifold 115 may be formed of elastic material(s) and dimensioned to provide a greater rigidity than the pliable body member 125 in the first structural state. In one non-limiting example, the manifold 115 may be formed of a same elastomeric material as the pliable body member 125, but has a much greater thickness than walls of the pliable body member 125. In some cases, the manifold 115 formed of elastic material(s) may be deformable or selectively deformable.

The manifold 115 and the interface system 110 may be connected through any suitable means. In some embodiments, the manifold 115 and the interface system 110 are removably connected using threaded fasteners such as screws or bolts. In other embodiments, the manifold 115 and the interface system 110 are integrally formed.

The end effector 105 comprises a plurality of ports. A vacuum port 150 is in fluid communication with the inner recess 135 and is configured to apply suction force to the inner recess 135 (e.g., when sealed by the sealing surface 140). A signaling port 155 is in communication with one or more actuators 160, and control signals communicated via the signaling port 155 cause the one or more actuators 160 to selectively apply a force to, or otherwise cause a compliant interaction with, the interface system 110 via the linkage system 175. Depending on the configuration of the one or more actuators 160 and the linkage system 175, the applied force deforms the interface system 110 according to one or more degrees of freedom.

Figure 2A:
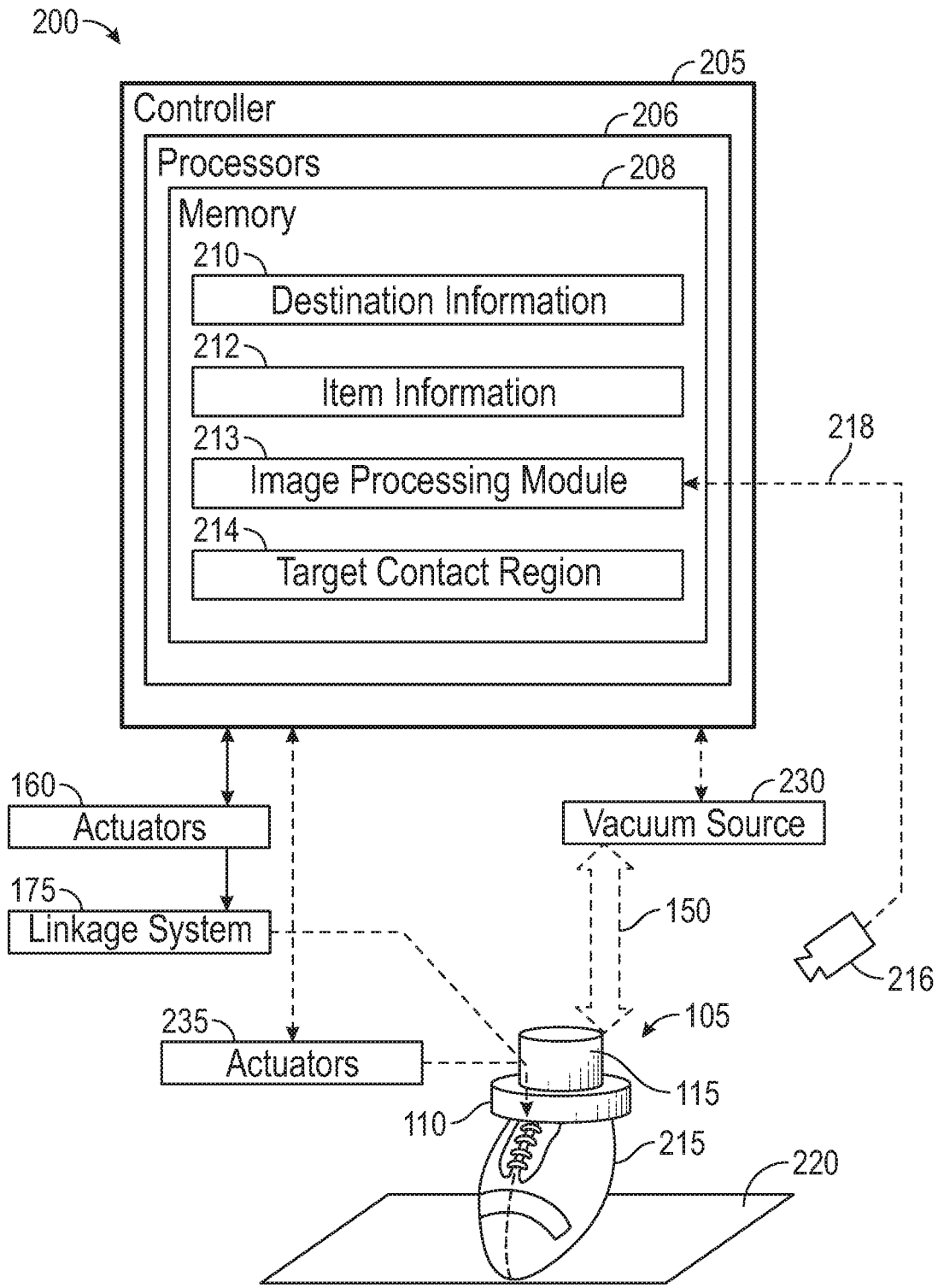
FIGS. 2A and 2B illustrate moving an item using an end effector, according to various embodiments.
Figure 2B:
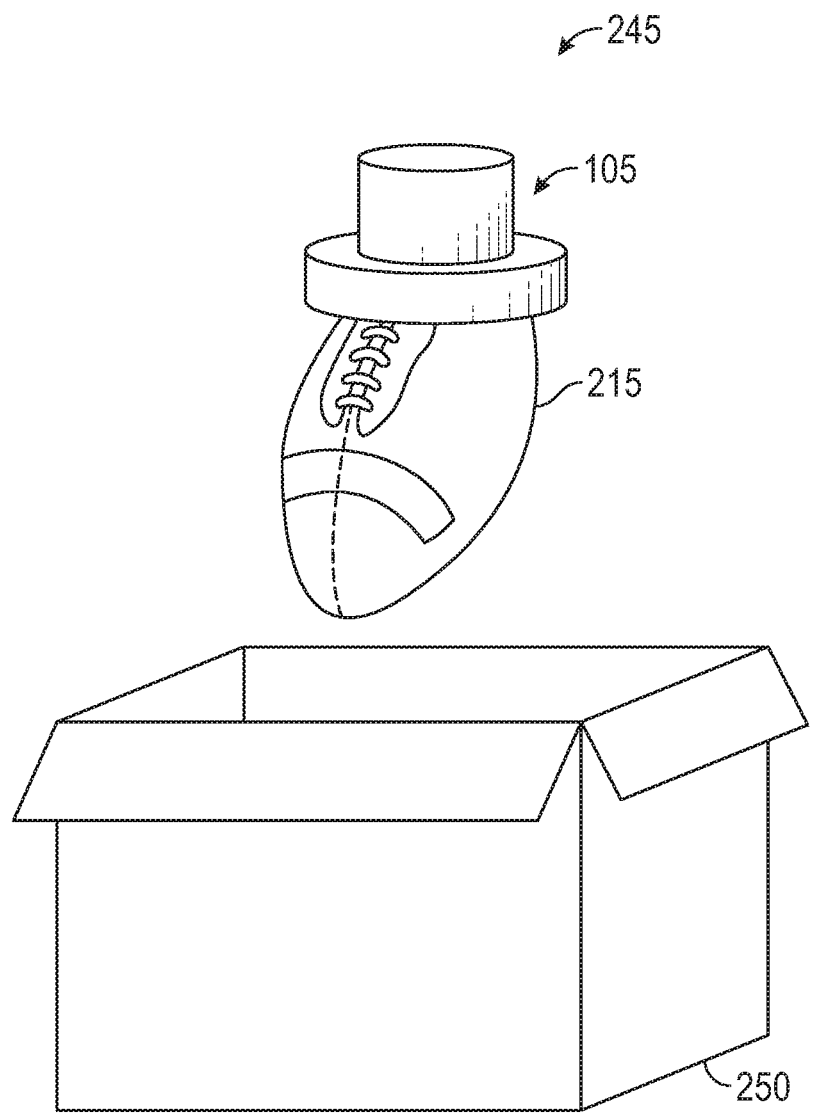

FIGS. 2A, 2B illustrate moving an item using an end effector, according to various embodiments. The features illustrated in diagrams 200, 245 may be used in conjunction with other embodiments, such as the end effector 105 of FIGS. 1A and 1B.

The diagram 200 comprises a controller 205 that is configured to interface with the end effector 105 through at least the vacuum port 150 and the one or more actuators 160 via the signaling port 155. In some embodiments, the controller 205 is further configured to interface with the end effector 105 through one or more actuators 235 connected thereto. The one or more actuators 235 may have any suitable form, and may control the end effector 105 according to one or more degrees of freedom. For example, the one or more actuators 235 may be configured to translate and/or rotate the end effector 105. Some non-limiting examples of the one or more actuators 235 comprise articulating and/or telescoping robotic arms, which may attach to a proximal end of the end effector 105.

The controller 205 comprises one or more computer processors 206 and a memory 208. The one or more computer processors 206 represent any number of processing elements that each can include any number of processing cores. Some non-limiting examples of the one or more computer processors 206 include a microprocessor, a digital signal processor (DSP), an application-specific integrated chip (ASIC), and a field programmable gate array (FPGA), or combinations thereof. The memory 208 may comprise volatile memory elements (such as random access memory), non-volatile memory elements (such as solid-state, magnetic, optical, or Flash-based storage), and combinations thereof. Moreover, the memory 208 may be distributed across different mediums (e.g., network storage or external hard drives).

The memory 208 may comprise a plurality of "modules" for performing various functions described herein. In one embodiment, each module includes program code that is executable by one or more of the computer processors 206. However, other embodiments may include modules that are partially or fully implemented in hardware (i.e., circuitry) or firmware of the controller 205. As shown, the memory 208 comprises an image processing module 213 configured to perform image processing on imagery 218 received from one or more visual sensors 216 in the environment. The imagery 218 may have any suitable form, such as one or more still images or video.

In some embodiments, the image processing module 116 is configured to perform feature extraction and/or image segmentation of the imagery 218, although any other suitable techniques are also contemplated. The image processing performed on the imagery 218 may be used to locate and/or identify the item 215, and/or to determine a positioning and/or orientation of the end effector 105 relative to the item 215. In some embodiments, the memory 208 comprises item information 212 associated with the different items in the environment. Visual characteristics included in the item information 212 may be used by the image processing module 116 to identify the item 215 and/or identify an orientation of the item 215 (e.g., a comparison of the imagery 218 with the item information 212).

In some embodiments, the image processing module 213 is further configured to identify a target contact region 214 of the item 215. The target contact region 214 represents a region of the item 215 that is estimated to provide a relatively good seal with the interface system of the end effector 105. The target contact region 214 may be determined based on a current orientation of the item 215, and may be determined based on the assumption that the item 215 will not be displaced and/or rotated prior to the end effector 105 contacting the item 215. The image processing module 213 may comprise one or more predefined rules for determining the target contact region 214. For example, a first rule may specify that planar surfaces are preferred for the target contact region 214 over rounded surfaces or corners, a second rule may specify that larger surfaces are preferred to smaller surfaces, and a third rule may specify that a corner having a linear (or other elongated) intersection is preferred to a corner having a point intersection. The one or more predefined rules may be based on properties of the end effector 105 (e.g., values or ranges of size, shape, vacuum force, etc.), which may reflect deformation of the interface system by the one or more actuators 160. The one or more predefined rules may also be prioritized relative to each other.

For example, assume that the item 215 has a rectangular shape, with relatively large planar surfaces (e.g., larger than an inner diameter of the inner recess of the end effector 105 in an undeformed state) on two sides, and relatively small planar surfaces (e.g., smaller than the inner diameter) on the other four sides. However, assume further that the large planar surfaces of the item 215 are partially or completely inaccessible by the end effector 105 in a current orientation of the item 215 (e.g., the item 215 is obscured by other items, resting against a surface such as a sidewall or floor, etc.). As it is not feasible to contact only a large planar surface in the current orientation of the item 215, the image processing module 213 may select a "next-best" target contact region, such as an elongated intersection of two sides as specified by the example third rule above.

In conjunction with identifying the target contact region 214, the image processing module 213 may determine a geometry of the target contact region 214. Based on the geometry of the target contact region 214, the controller 205 may send control signals to the one or more actuators 160 to deform the interface system 110 (e.g., pre-shaping the sealing surface at the distal end of the end effector 105). The controller 205 may additionally or alternately send control signals to the one or more actuators 235 to reorient the interface system relative to the item 215 prior to contacting the item 215.

In some embodiments, the controller 205 is configured to transmit control signals to the one or more actuators 235 to provide the end effector 105 with a desired positioning and/or orientation for contacting and/or handling the item 215. In the diagram 200, the end effector 105 has been brought into contact with the item 215 resting on a surface 220. In some alternate embodiments, the end effector 105 and/or the item 215 may be manually moved to provide the contacting relationship, and/or to displace the end effector 105 and the suctioned item 215 to the predefined location. For example, the end effector 105 may include a handle allowing a user to rotate and/or displace the end effector 105.

In some embodiments, the controller 205 is configured to transmit control signals to a vacuum source 230 to selectively apply a vacuum to the inner recess of the end effector 105. The vacuum source 230 may have any suitable implementation, such as a vacuum pump connected to the vacuum port 150 via a flexible hose. Applying the vacuum to the inner recess operates to apply an astrictive force to the item 215, thereby suctioning the item 215 to the end effector 105. In some embodiments, the controller 205 transmits control signals to the one or more actuators 160 to apply an impactive force to the item 215 (e.g., grasping) via the linkage system 175. Applying the impactive force may be independent of applying an astrictive force, or the two may be used in combination. Further, applying the impactive force and the astrictive force may any suitable sequencing. In some embodiments, when the item 215 has been moved to the predefined location, the controller 205 transmits control signals to the one or more actuators 160 and/or the vacuum source 230 to release the grasp and/or the suction on the item 215.

The controller 205 may further transmit control signals to the one or more actuators 235 to displace the end effector 105 and the now-suctioned item 215 to a predefined location, which in some cases may be specified by destination information 210 included in the memory 208 and associated with the item 215. The destination information 210 may have any suitable form, such as a destination within the warehouse (e.g., a particular container 250 or a particular environment location), a destination external to the warehouse (e.g., a portion of a destination mailing address or a particular vehicle for external transport), and so forth. In some embodiments, the controller 205 acquires the destination information 210 from one or more computing devices that are networked with the controller 205.

Figure 3:
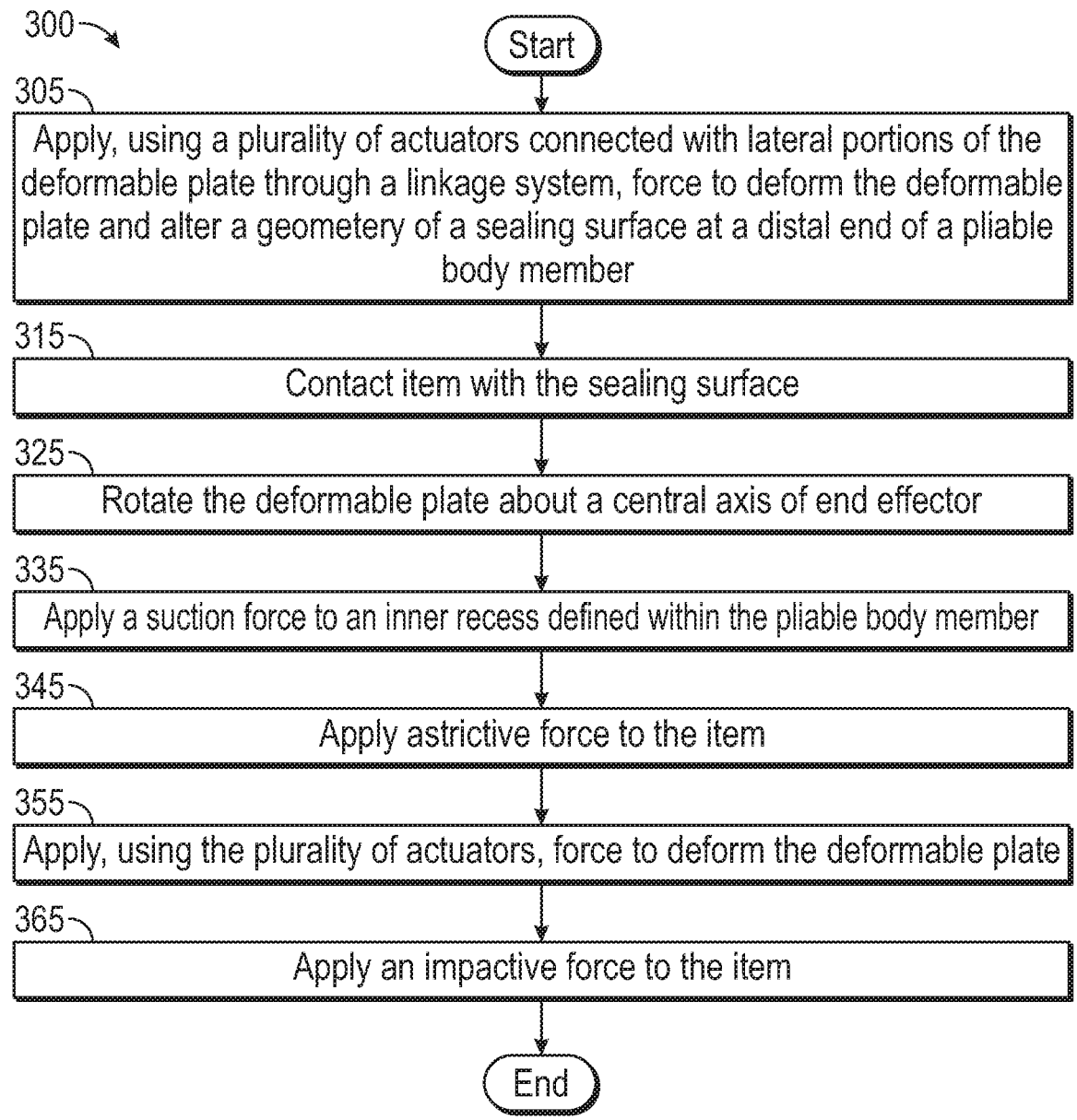
FIG. 3 illustrates an exemplary method of prehending items using impactive and astrictive forces, according to various embodiments.

FIG. 3 illustrates an exemplary method 300 of prehending items using impactive and astrictive forces, according to various embodiments. The method 300 may be used in conjunction with other embodiments, such as using any implementation of an end effector described herein.

The method 300 begins at block 305, where a force is applied, using a plurality of actuators connected with lateral portions of a deformable plate through a linkage system, to deform the deformable plate and alter a geometry of a sealing surface at a distal end of a pliable body member. In some embodiments, the pliable body member may be dynamically shaped to more closely match a surface geometry of an item to be suctioned by the end effector.

At block 315, an item is contacted with the sealing surface. At block 325, the deformable plate is rotated about a central axis of the end effector. In some embodiments, at least one component of the linkage system is rotatable about a rotation axis to cause the deformable plate to rotate about the central axis. In this way, the end effector may be capable of self-aligning with the item, which allows the sealing surface to be more closely aligned with the geometry of the item.

At block 335, a suction force is applied to an inner recess defined within the pliable body member. In some embodiments, the suction force is applied after contacting the item with the sealing surface. In other embodiments, the suction force is applied prior to contacting the item with the sealing surface, which in some cases may further alter the geometry of the sealing surface. At block 345, an astrictive force is applied to the item.

At block 355, a force is applied, using the plurality of actuators, to deform the deformable plate. At block 365, an impactive force is applied to the item through the linkage system. The method 300 ends following completion of block 365.

Figure 4:
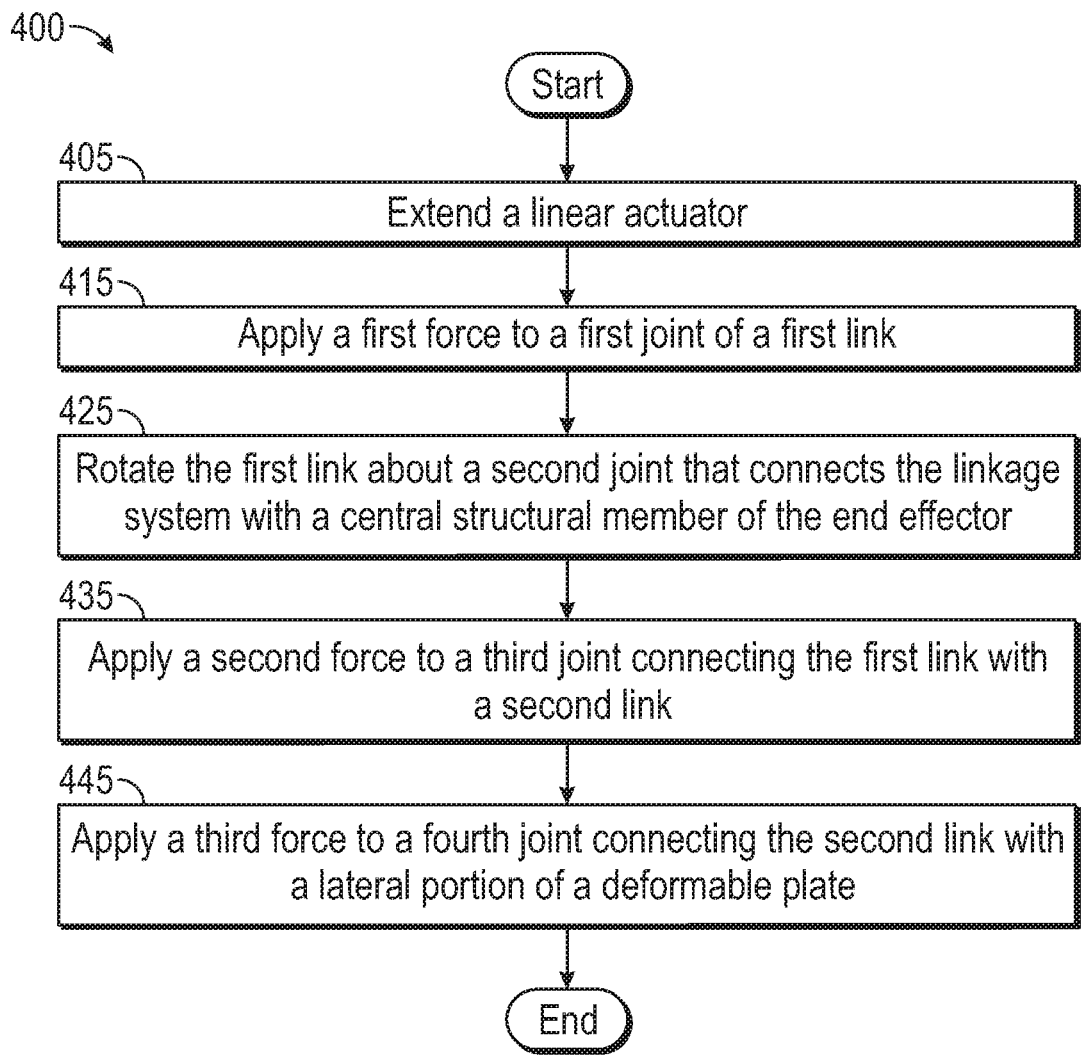
FIG. 4 illustrates an exemplary method of operating a linkage system of an end effector, according to various embodiments.

FIG. 4 illustrates an exemplary method 400 of operating a linkage system of an end effector, according to various embodiments. The method 400 may be used in conjunction with other embodiments, such as using any implementation of an end effector described herein. The method 400 may also represent one example implementation of the blocks 305, 355 of FIG. 3 discussed above.

At block 405, a linear actuator is extended. At block 415, a first force is applied to a first joint of a first link. In some embodiments, the first joint is at a first radial distance from a central axis of the end effector. At block 425, the first link is rotated about a second joint that connects the linkage system with a central structural member of the end effector. In some embodiments, the second joint is at a second radial distance less than the first radial distance.

At block 435, a second force is applied to a third joint connecting the first link with a second link. In some embodiments, the third joint is at a third radial distance greater than the first radial distance. At block 445, a third force is applied to a fourth joint connecting the second link with a lateral portion of a deformable plate. In some embodiments, the fourth joint is at a fourth radial distance greater than the third radial distance. The method 400 ends following completion of block 445.

FIGS. 5A-5E are views of an end effector having an exemplary implementation of the linkage system 175, according to various embodiments. The features illustrated in diagrams 500, 515, 545, 570, 575 may be used in conjunction with other embodiments discussed herein.

Figure 5A:
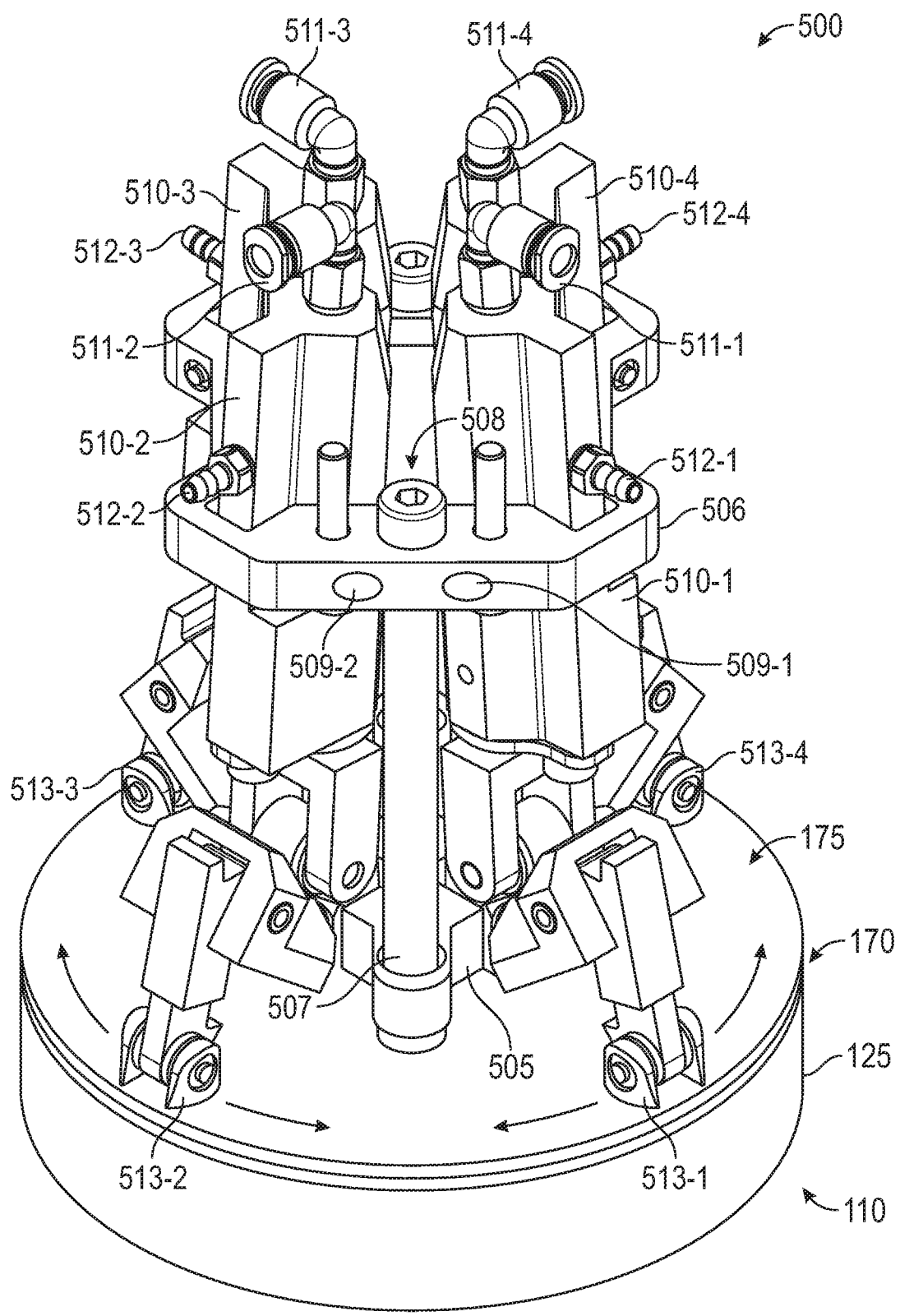
FIGS. 5A-5E are views of an end effector having an exemplary implementation of a linkage system, according to various embodiments.

Diagram 500 of FIG. 5A is an isometric view of the end effector, which comprises the linkage system 175 that connects a plurality of linear actuators 510-1, 510-2, 510-3, 510-4 with the interface system 110. The end effector further comprises a central structural member 505, which connects with the linkage system 175 via at least one joint. In some embodiments, at least one component of the linkage system 175 is rotatable about a rotation axis, which causes the mounting plate 170 to rotate about the central axis C (illustrated in FIGS. 5B, 5C) of the end effector. In some cases, the rotation of the mounting plate 170 also occurs within the plane of the mounting plate 170.

The end effector further comprises a second central structural member 506 that is spaced apart from, and rigidly connected with, the central structural member 505. A rod 507 extends between lateral portions of the central structural member 505 and of the second central structural member 506. Although not shown in the diagram 500, one or more other rods may extend between the central structural member 505 and of the second central structural member 506. The rod 507 has a longitudinal axis parallel to the central axis C. The rod 507 may be secured to the central structural member 505 and to the second central structural member 506 using, e.g., threaded fasteners.

An opening 508 extends through the plane of the second central structural member 506, and is dimensioned and arranged such that each of the linear actuators 510-1, 510-2, 510-3, 510-4 extend through the opening 508. Each of the linear actuators 510-1, 510-2, 510-3, 510-4 may be secured to the second central structural member 506, e.g., using threaded fasteners inserted into openings 509-1, 509-2 that are defined within the plane of the second central structural member 506. In some embodiments, each of the linear actuators 510-1, 510-2, 510-3, 510-4 is rotatable about a rotation axis, e.g., rotatable about respective shanks of the threaded fasteners.

Each of the linear actuators 510-1, 510-2, 510-3, 510-4 connects with the linkage system 175 at a respective first end. The linkage system 175 connects each of the linear actuators 510-1, 510-2, 510-3, 510-4 with the interface system 110 at a respective base 513-1, 513-2, 513-3, 513-4 disposed at a top surface of the mounting plate 170.

A respective input port 511-1, 511-2, 511-3, 511-4 is arranged at a second end of each of the linear actuators 510-1, 510-2, 510-3, 510-4 that is opposite the first end. Each of the linear actuators 510-1, 510-2, 510-3, 510-4 has a respective exhaust port 512-1, 512-2, 512-3, 512-4 that may limit the travel of the respective linear actuator. For example, compressed gas applied at the input port 511-1 causes the linear actuator 510-1 to extend. Extending the linear actuator 510-1 applies a force through the linkage system 175 to the interface system 110 at the base 513-1. As the linear actuator 510-1 extends beyond a threshold length, the exhaust port 512-1 becomes communicatively coupled with the input port 511-1 and a portion of the compressed gas exits through the exhaust port 512-1, preventing the linear actuator 510-1 from extending further. In some embodiments, the exhaust ports 512-1, 512-2, 512-3, 512-4 may be effectively stopped (e.g., mechanically plugged, a compressed gas applied with a similar pressure to that of the input ports 511-1, 511-2, 511-3, 511-4, and so forth), which allows the linear actuators 510-1, 510-2, 510-3, 510-4 to extend further.

Figure 5B:
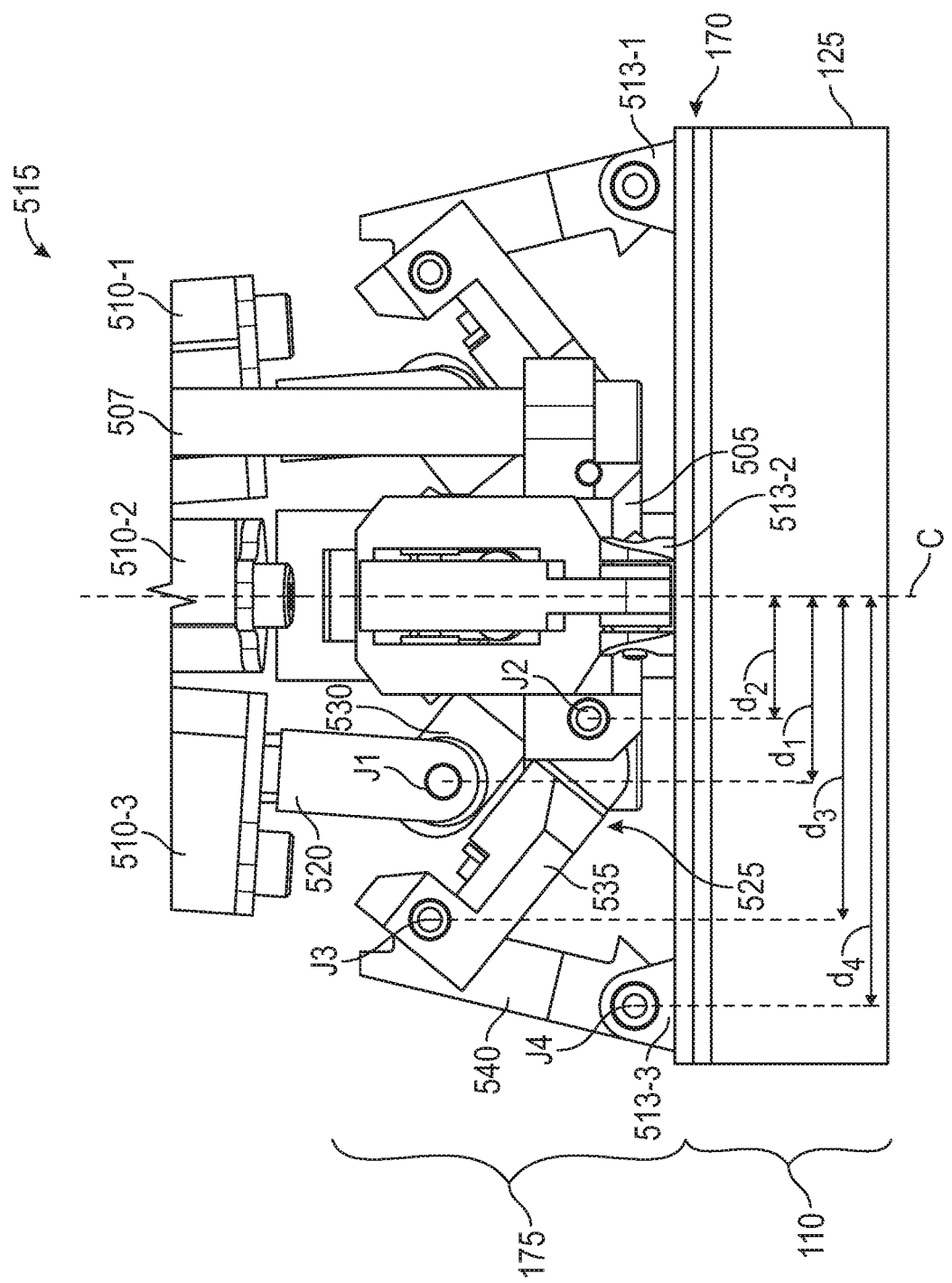

Diagram 515 of FIG. 5B is a side view of the end effector with the mounting plate 170 in an undeformed state. A first link 525 is connected with a first end 520 of the linear actuator 510-3 at a first joint J1. The first joint J1 is at a first radial distance $d_1$ from the central axis C. As shown, the first link 525 comprises a first link component 530 and a second link component 535 that is rotatable relative to the first link component. Alternate implementations may include a monolithic first link 525.

The first link 525 is further connected with the central structural member 505 via a second joint J2. The second joint J2 is at a second radial distance $d_2$ that is less than the first radial distance $d_1$. As shown, the first link 525 connects directly with the central structural member 505. More specifically, the first link component 530 connects the end 520 of the linear actuator 510-3 with the central structural member 505, and the second link component 535 rotatably connects the first link component 530 with a second link 540. As shown in FIG. 5D, the first link component 530 is rotatable relative to the central structural member 505 about a rotation axis 541, and the second link component 535 is rotatable relative to the first link component 530 about a rotation axis 544. Alternate implementations may have one or more intermediate components between the first link 525 and the central structural member 505.

Returning to FIG. 5B, the second link 540 is connected with the first link 525 at a third joint J3. The third joint J3 is at a third radial distance $d_3$ that is greater than the first radial distance $d_1$. The second link 540 is further connected to a lateral portion of the mounting plate 170 at a fourth joint J4 at the base 513-3. The fourth joint J4 is at a fourth radial distance $d_4$ that is greater than the third radial distance $d_3$.

Figure 5C:
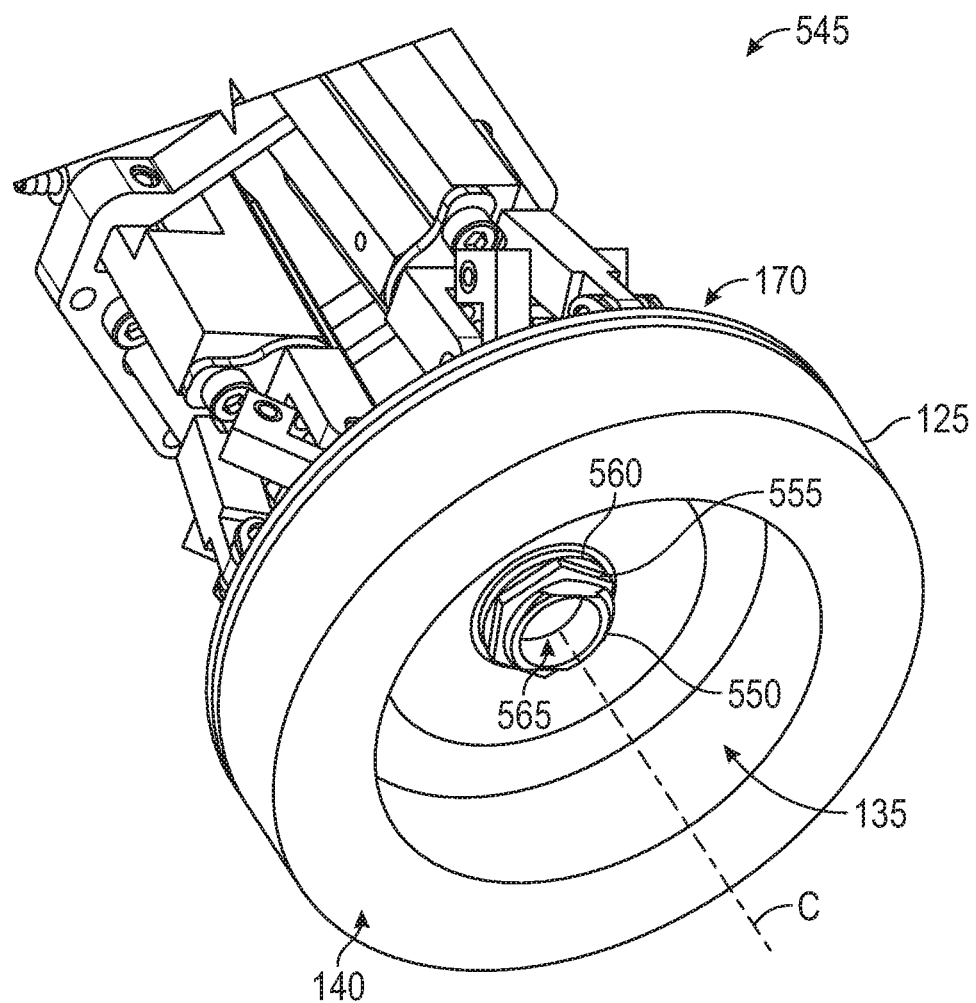
Figure 5D:
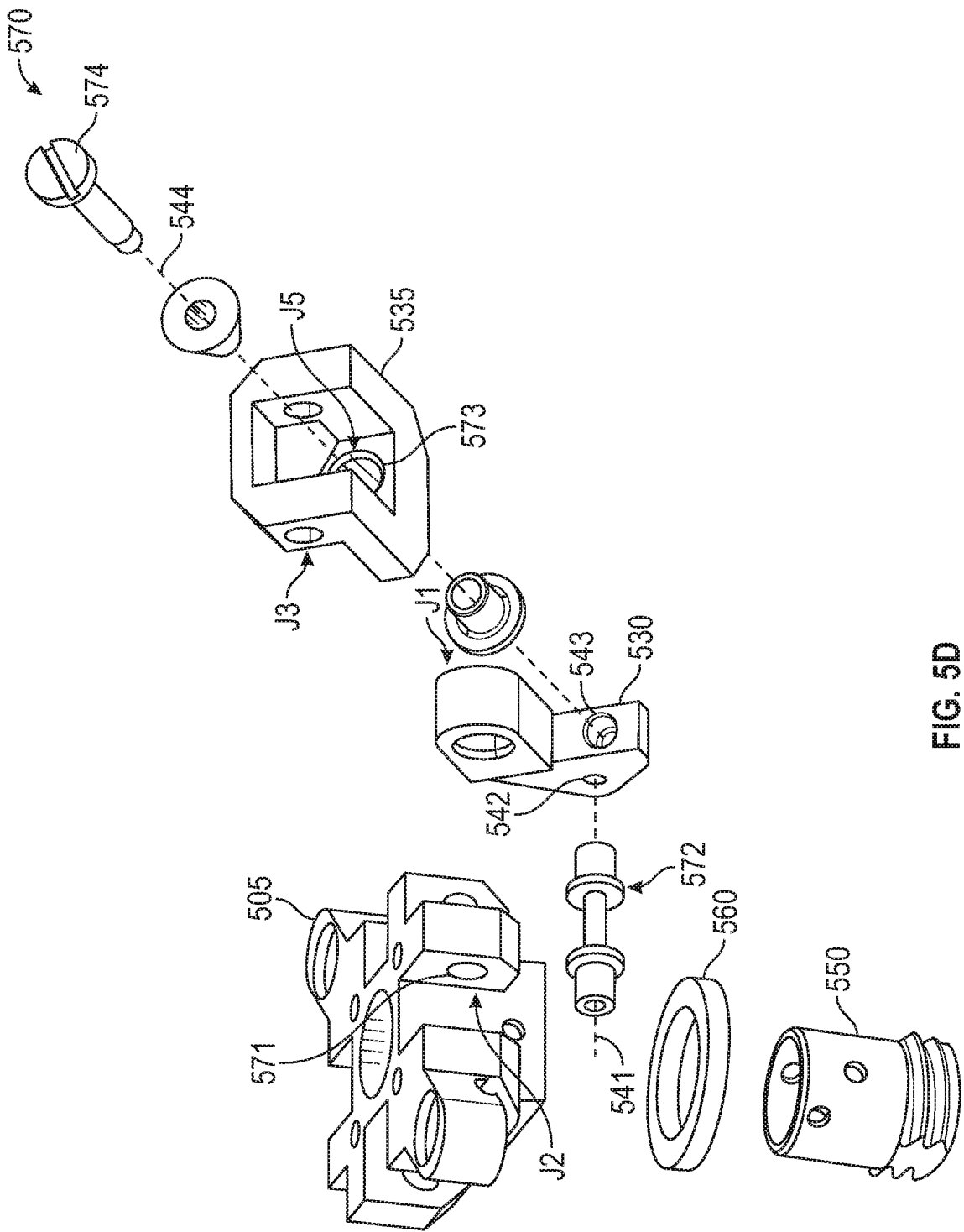

Diagram 545 of FIG. 5C is a bottom perspective view of the end effector. As shown, the pliable body member 125 is attached to a flexible backing plate that is attached to the mounting plate 170 (e.g., via adhesive layer, glue, and/or fabric). In other implementations the pliable body member 125 may be attached directly to the mounting plate 170.

A threaded pipe 550 connects to the central structural member 505 and extends through the mounting plate 170 and backing plate (if present) into the inner recess 135. A washer 560 is arranged around the threaded pipe 550, and a nut 555 engages with the threaded pipe 550 to removably secure the backing plate and/or mounting plate 170 to the central structural member 505. The threaded pipe 550 defines an opening 565 which allows a vacuum port to be in fluid communication with the inner recess 135.

Diagram 570 of FIG. 5D provides an exploded view of the first link 525. The central structural member 505 defines openings 571 that are dimensioned and arranged to receive a pin 572. The pin 572 may contact the central structural member 505 directly, or may contact intermediate spacer(s) (e.g., flanged bushings). The pin 572 also extends through an opening 542 of the first link component 530, forming the joint J2 in which the rotation axis is a longitudinal axis 541 of the pin 572.

An opening 573 extends through the second link component 535 and is dimensioned and arranged to receive a pin 574. The pin 574 may contact the second link component 535 directly, or may contact intermediate spacer(s). The pin 574 also extends into an opening 543 of the first link component 530, forming a joint J5 permitting rotation of the second link component 535 relative to the first link component 530. The rotation axis of the joint J5 is a longitudinal axis 541 of the pin 572.

Figure 5E:
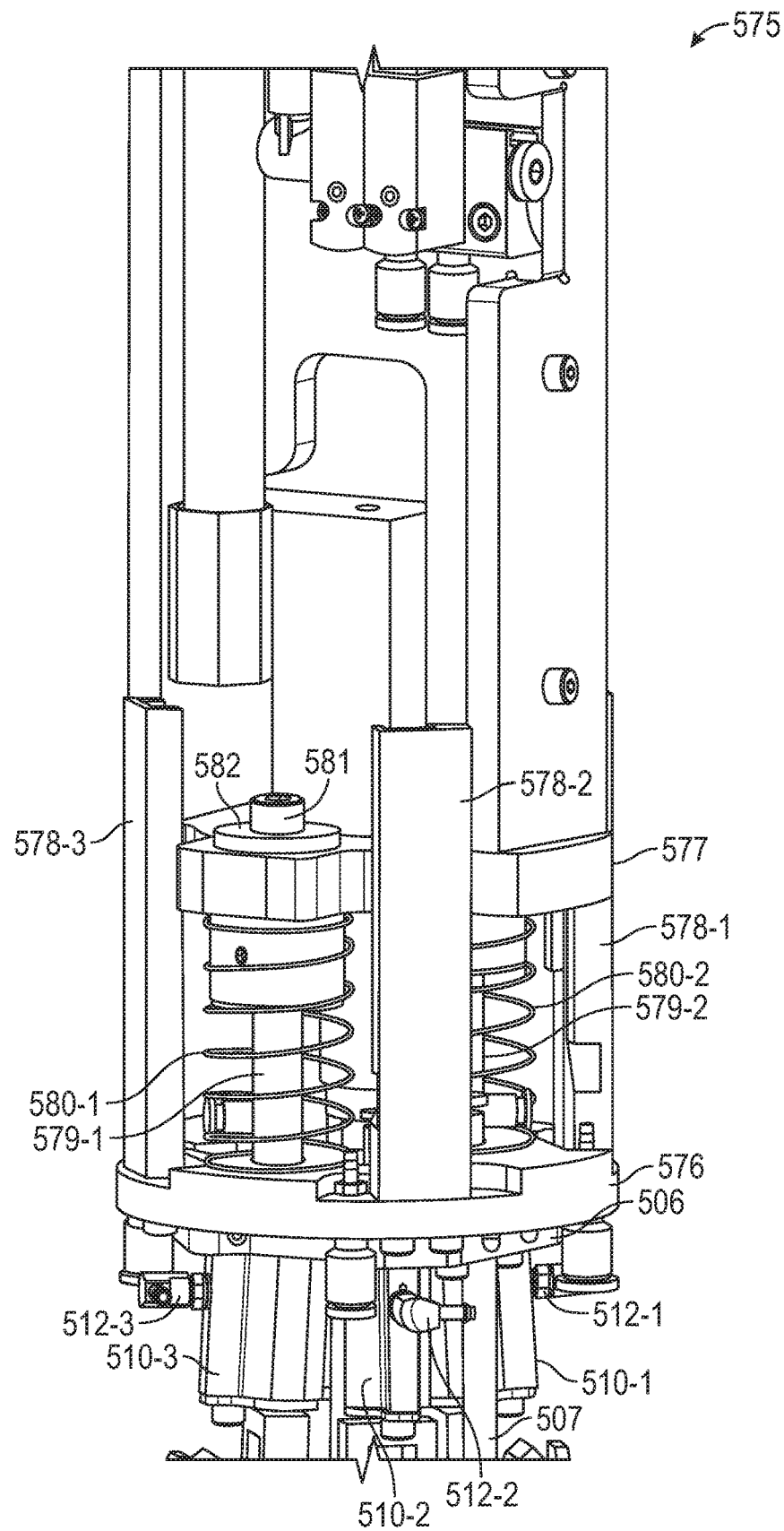

Diagram 575 of FIG. 5E is a side perspective view of the end effector. Notably, the exhaust ports 512-1, 512-2, 512-3 are depicted in the diagram 575 as being distally arranged relative to the second central structural member 506, instead of being proximally arranged as in FIG. 5A.

A third central structural member 576 is connected with to the second central structural member 506, e.g., via threaded fasteners. As shown, the third central structural member 576 and the second central structural member 506 are directly contacting. An opening formed through the third central structural member 576 is dimensioned and arranged to permit rigid and/or flexible tubing to pass through the third central structural member 576 and the second central structural member 506, enabling fluid communication between a vacuum source and the inner recess 135 of the pliable body member 125.

A fourth central structural member 577 is spaced apart from and connected with the third central structural member 576. As shown, rods 579-1, 579-2 extend between the third central structural member 576 and the fourth central structural member 577. The rods 579-1, 579-2 have longitudinal axes that are parallel to the central axis of the end effector. Springs 580-1, 580-2 are arranged around respective rods 579-1, 579-2 and contact the third central structural member 576 and the fourth central structural member 577.

Threaded fasteners and/or washers connected with the respective rods 579-1, 579-2 may be used to maintain the third central structural member 576 and the fourth central structural member 577 at a first distance from each other. When at the first distance, the springs 580-1, 580-2 exert a first spring force on the third central structural member 576 and the fourth central structural member 577. A threaded fastener 581 and washer 582 contact the fourth central structural member 577 to retain the third central structural member 576 and the fourth central structural member 577 at the first distance.

In some embodiments, the rods 579-1, 579-2 extend through respective openings in the fourth central structural member 577, and are slidingly coupled with the sidewall(s) defining the openings. Responsive to a force applied at the distal end of the end effector (e.g., when an item is contacted with the sealing surface 140), the third central structural member 576 displaces in the proximal direction. This displacement causes the rods 579-1, 579-2 to slide in the proximal direction (e.g., such that the threaded fastener 581 and/or the washer 582 are not contacting the fourth central structural member 577), and the springs 580-1, 580-2 compress and exert a second spring force greater than the first spring force. In this way, the end effector provides compliance in the vertical direction in addition to any compliance provided by the pliable body member 125. The additional compliance may allow the end effector to form an improved seal with the item.

As discussed above, at least one component of the linkage system 175 may be rotatable, enabling the mounting plate 170 to rotate about the central axis of the end effector. In some embodiments, the assembly of the second central structural member 506 and the third central structural member 576 is rotatable, which further enables the mounting plate 170 to rotate. In some embodiments, projecting members 578-1, 578-2, 578-3 extend from the surface of the third central structural member 576 in the proximal direction. The projecting members 578-1, 578-2, 578-3 may be connected with the third central structural member 576 using threaded fasteners. In some embodiments, the length of the projecting members 578-1, 578-2, 578-3 is greater than the first distance between the third central structural member 576 and the fourth central structural member 577. In some embodiments, a plurality of grooves are defined by a perimeter of the fourth central structural member 577, and each projecting member 578-1, 578-2, 578-3 extends through a respective groove. In this way, the grooves and the projecting members 578-1, 578-2, 578-3 may act as mechanical stops, limiting the rotation of the assembly of the second central structural member 506 and the third central structural member 576.

Figure 6A:
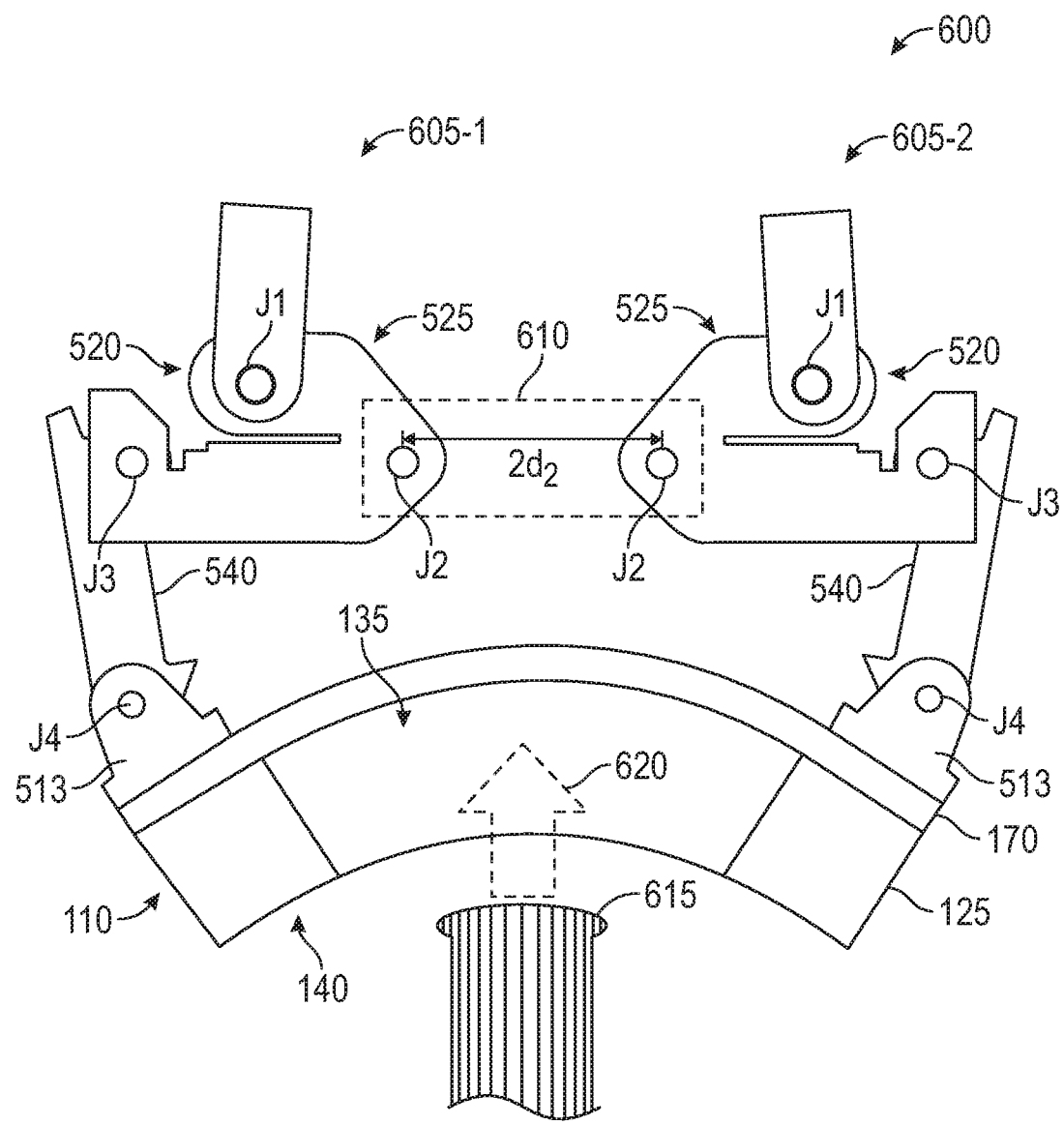
FIGS. 6A and 6B illustrate an exemplary sequence of prehending an item using an end effector, according to various embodiments.
Figure 6B:
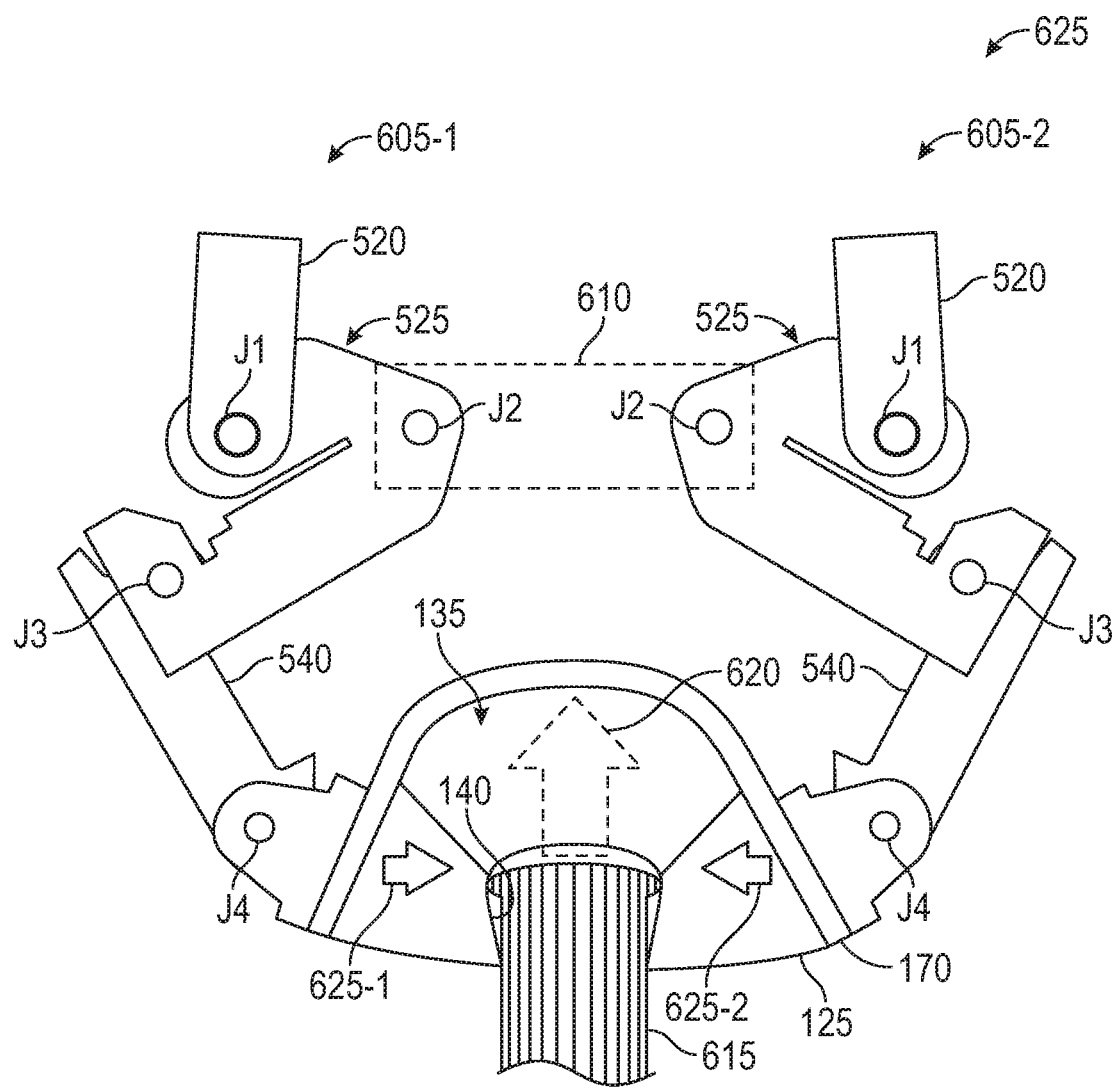

FIGS. 6A, 6B illustrate an exemplary sequence of prehending an item using an end effector, according to various embodiments. Although diagrams 600, 625 depict portions of the linkage system 175 of FIGS. 5A-5E, the principles may be applied to other implementations of the linkage system 175, such as those of FIGS. 8A-8D discussed below.

As discussed above, the diagram 500 of FIG. 5B represents a state of the end effector in which the mounting plate 170 is in an undeformed state. In diagram 600 of FIG. 6A, the mounting plate 170 is in a first deformed state. In diagram 625 of FIG. 6B, the mounting plate 170 is in a second deformed state in which the end effector, through the mounting plate 170 and the pliable body member 125, applies impactive forces 625-1, 625-2 to an item 615 (as shown, along the spine of a book).

The diagrams 600, 625 show two linkages 605-1, 605-2 of the linkage system, corresponding to a pair of opposing linear actuators within a first plane. As the actuators extend (as shown, generally in the downward direction), the end 520 of each linkage 605-1, 605-2 moves in the downward direction.

The downward motion of the end 520 applies a first force to the first joint J1, which causes the first link 525 to rotate about the second joint J2 that connects the respective linkage 605-1, 605-2 to a central structural member (represented as outline 610). Assuming the second joints J2 are symmetrically arranged around the center axis of the end effector, the distance between the second joints J2 is $2d_2$.

Rotating the first link 525 causes a second force to be applied to the third joint J3 connecting the first link 525 to the second link 540. Applying the second force to the third joint J3 causes a third force to be applied to the fourth joint J4 connecting the second link 540 with a base 513 arranged at a lateral portion of the mounting plate 170, deforming the mounting plate 170 and altering a geometry of the sealing surface 140.

In some embodiments, the first deformed state shown in diagram 600 represents a pre-shaping of the pliable body member 125 to cause the sealing surface 140 to more closely match a geometry of the item 615. When an astrictive force 620 is applied to the inner recess, a better quality seal may be formed with the pre-shaped pliable body member 125 than if the pliable body member 125 were in an undeformed state.

In the diagram 625, the actuators extend further in the downward direction, causing the mounting plate 170 to deform further. As shown, the end effector through the mounting plate 170 and the pliable body member 125, applies the impactive forces 625-1, 625-2 to the item 615, which may be in combination with application of the astrictive force 620. In alternate implementations, the end effector may apply the impactive forces 625-1, 625-2 through the mounting plate 170.

Figure 7A:
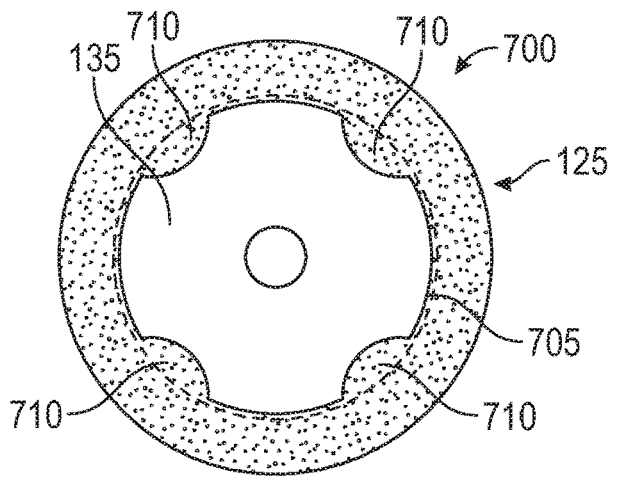
FIGS. 7A-7C are bottom views illustrating altering a geometry of a sealing surface by deforming a deformable plate, according to various embodiments.
Figure 7B:
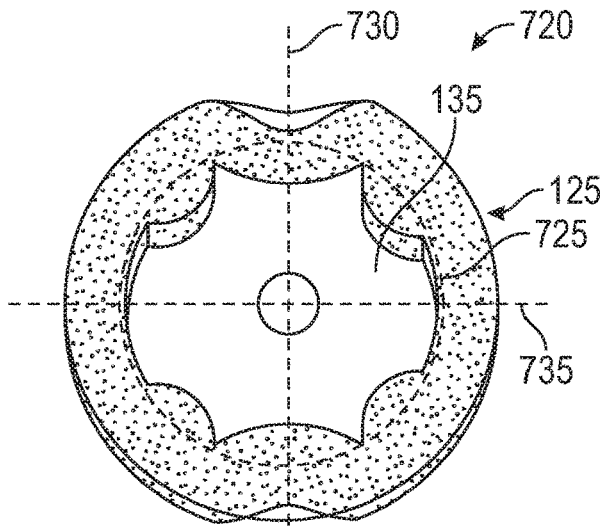
Figure 7C:
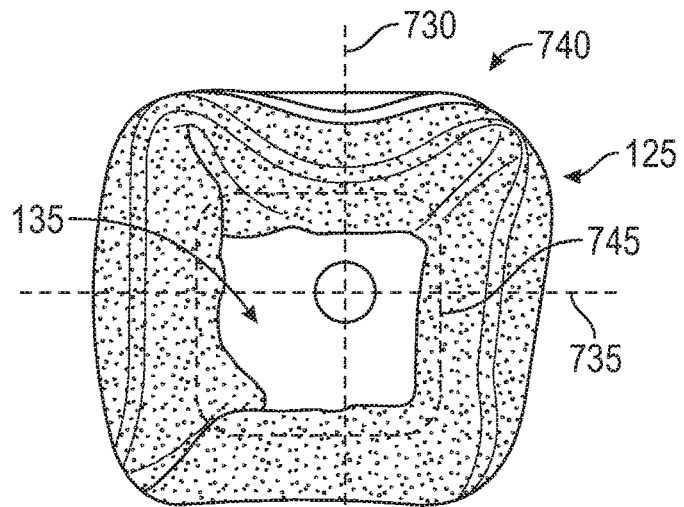

FIGS. 7A-7C are bottom views illustrating altering a geometry of a sealing surface by deforming a deformable plate, according to various embodiments. The features illustrated in diagrams 700, 720, 740 may be used in conjunction with other embodiments, such as using one or more pairs of opposing linear actuators (through respective linkages) to deform the deformable plate.

In the diagram 700, the pliable body member 125 is in an undeformed state and presents a substantially circular suction area 705. The pliable body member 125 defines a plurality of features 710 arranged around the inner recess 135, which may improve the controllability and/or the reproducibility of deforming the pliable body member 125. Although depicted as bumps projecting into the inner recess 135, other types of features 710 are also contemplated. Some alternate examples of the features 710 include gaps extending partly or fully through the pliable body member 125 along the bottom surface of the pliable body member 125, hole(s) extending into the pliable body member 125 from the bottom surface, and so forth. For the various examples of the features 710, the additional or removal of material of the pliable body member 125 encourages deformation of the pliable body member 125 in a controlled way.

In the diagram 720, the deformable plate is deformed by forces applied along a first dimension 730 (e.g., by a first pair of opposing linear actuators), such the pliable body member 125 is in a deformed state and presents a substantially oval (or elliptical) suction area 725. The elongated nature of the oval suction area 725 may be better suited for suctioning elongated items, such as a spine of a book. In the diagram 740, the deformable plate is deformed by forces applied along the first dimension 730 and a second dimension 735 (e.g., by a second pair of opposing linear actuators), such the pliable body member 125 is in a deformed state and presents a substantially square suction area 745. The smaller size of the square suction area 745 may be better suited for selectively suctioning smaller items.

Figure 8A:
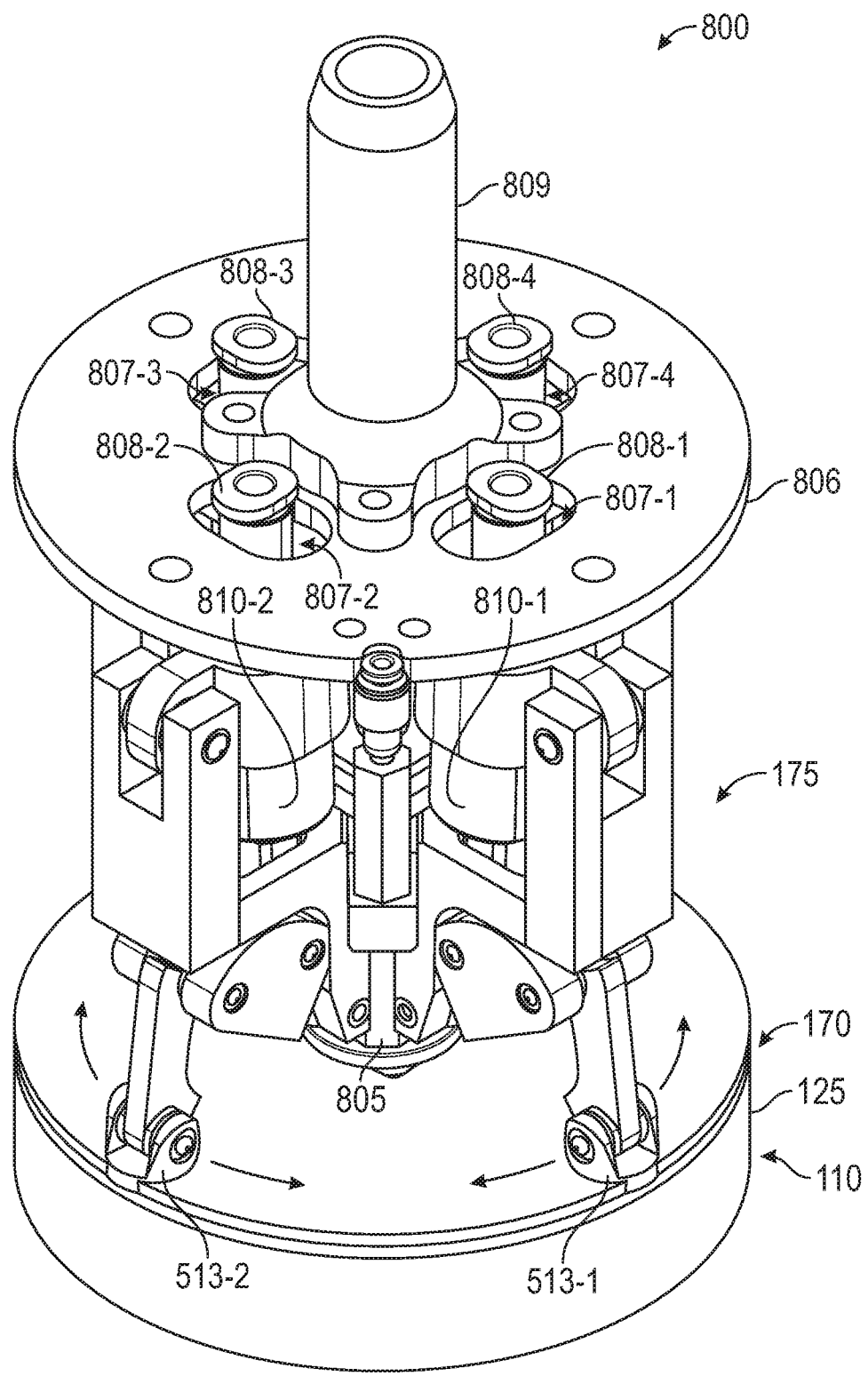
FIGS. 8A-8C are views of an end effector having another exemplary implementation of a linkage system, according to various embodiments.
Figure 8B:
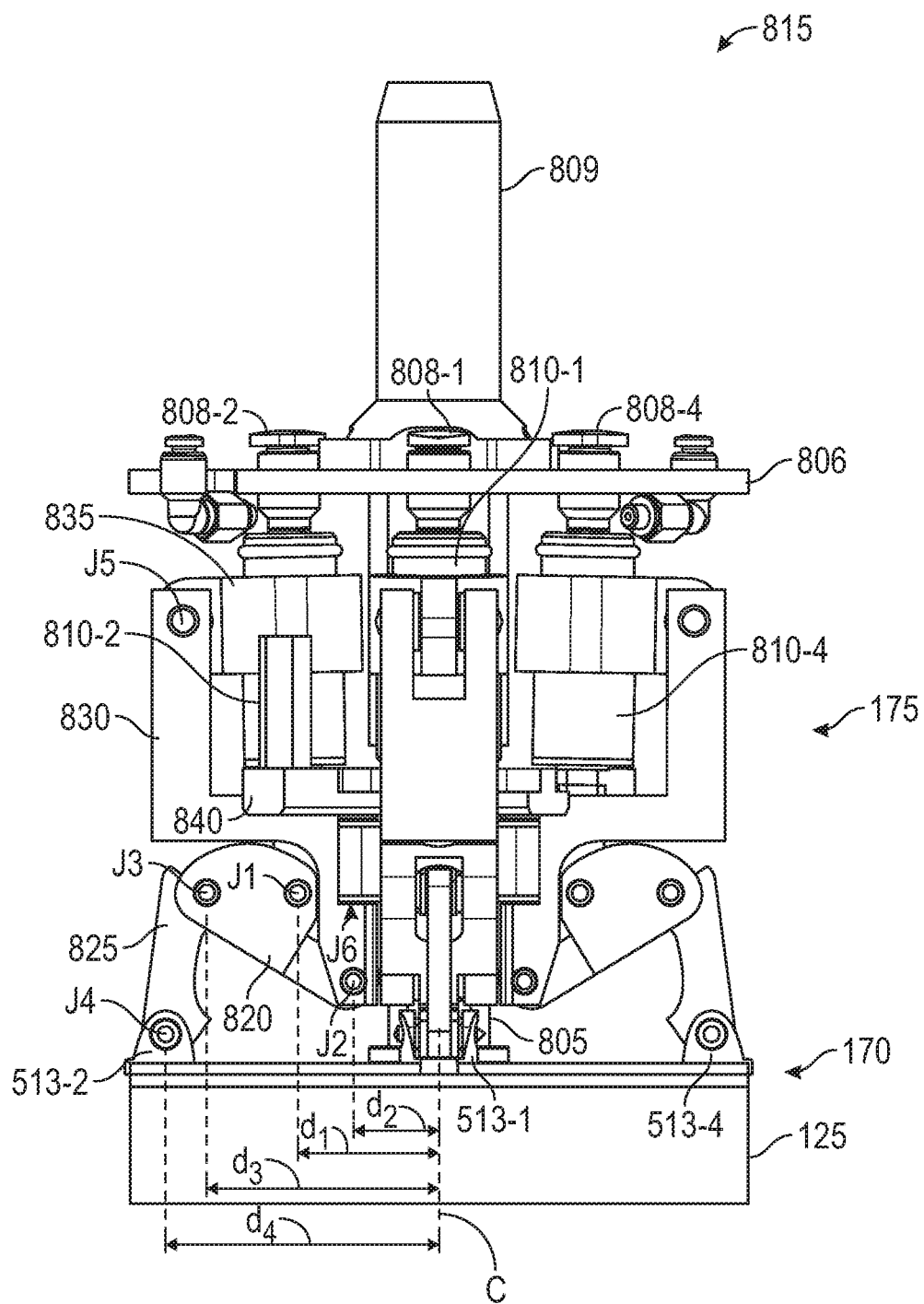
Figure 8C:
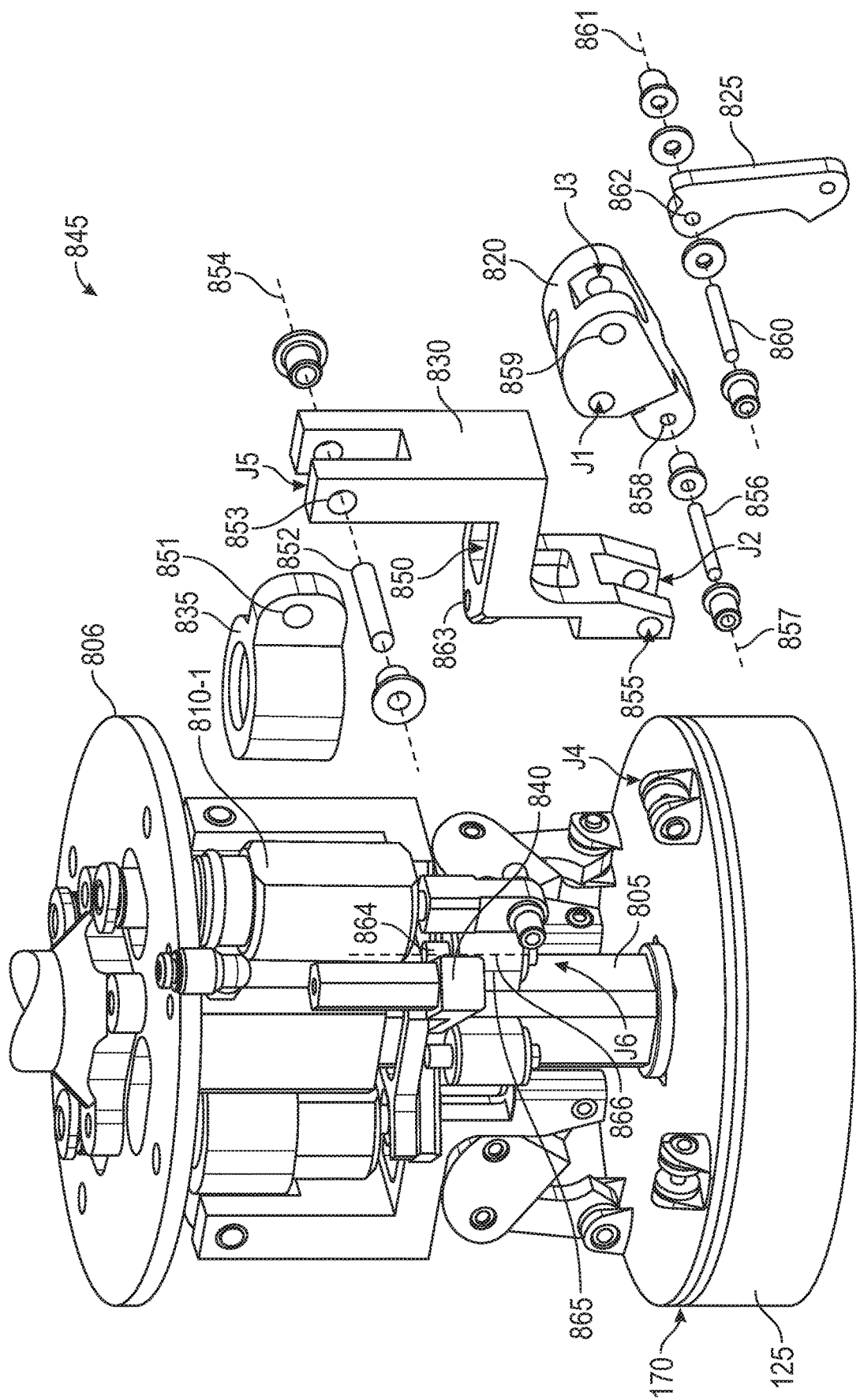

FIGS. 8A-8C are views of an end effector having another exemplary implementation of the linkage system 175, according to various embodiments. The features illustrated in diagrams 800, 815, 845 may be used in conjunction with other embodiments discussed herein.

Diagram 800 of FIG. 8A is an isometric view of the end effector, which comprises the linkage system 175 between a plurality of linear actuators 810-1, 810-2, 810-3, 810-4 and the interface system 110. The end effector further comprises a central structural member 805, which connects with the linkage system 175 via at least one joint. In some embodiments, at least one component of the linkage system 175 is rotatable about a rotation axis, which causes the mounting plate 170 to rotate about the central axis C of the end effector. In some cases, the rotation of the mounting plate 170 also occurs within the plane of the mounting plate 170. As shown in the diagram 815 of FIG. 8B, an intermediate member 830 is rotatable.

The end effector further comprises a second central structural member 806 spaced apart from, and rigidly connected with, the central structural member 805. The second central structural member 806 is generally disk-shaped with a plurality of openings 807-1, 807-2, 807-3, 807-4 extending therethrough. The second central structural member 806 may further define an opening permitting fluid communication through the second central structural member 806. Each of the plurality of linear actuators 810-1, 810-2, 810-3, 810-4 connects with the linkage system 175 at a first end and extends through a respective one of the openings 807-1, 807-2, 807-3, 807-4. A respective input port 808-1, 808-2, 808-3, 808-4 is arranged at a second end of each of the linear actuators 810-1, 810-2, 810-3, 810-4 that is opposite the first end. For example, compressed gas applied at the input port 808-1 causes the linear actuator 810-1 to extend. A vacuum port 809 is arranged around the central axis C and is connected with the second central structural member 806. Rigid tubing is arranged between the central structural member 805 and the second central structural member 806 and enables fluid communication between the vacuum port 809 and the inner recess 135 of the pliable body member 125.

The diagram 815 is a side view of the end effector with the mounting plate 170 in an undeformed state. A first link 820 is connected with an end (not shown) of the linear actuator 810-2 at a first joint J1. The first joint J1 is at a first radial distance $d_1$ from the central axis C. The first link 820 is further connected with the central structural member 805 via a second joint J2. The second joint J2 is at a second radial distance $d_2$ that is less than the first radial distance $d_1$. As shown, the first link 820 connects indirectly with the central structural member 805 via the intermediate member 830.

A second link 825 is connected with the first link 820 at a third joint J3. The third joint J3 is at a third radial distance $d_3$ that is greater than the first radial distance $d_1$. The second link 540 is further connected to a lateral portion of the mounting plate 170 at a fourth joint J4 at the base 513-2. The fourth joint J4 is at a fourth radial distance $d_4$ that is greater than the third radial distance $d_3$.

The intermediate member 830 further connects with an exterior of the linear actuator 810-2 via a fifth joint J5. The fifth joint J5 is at a fifth radial distance greater than the second radial distance $d_2$. In some embodiments, the fifth joint J5 is at a sleeve 835 arranged around the linear actuator 810-2. The sleeve 835 is configured to move along a length of the linear actuator 810-2 and/or to rotate about the linear actuator 810-2, e.g., as the intermediate member 830 is rotated.

The intermediate member 830 further connects with the central structural member 805 via a sixth joint J6. As shown, the sixth joint J6 has a radial distance close to the second radial distance $d_2$. In some embodiments, the rotation axis about which the at least one component of the linkage system 175 (e.g., the intermediate member 830) rotates is substantially parallel to the central axis C of the end effector.

Diagram 845 provides a partially exploded view of the end effector. The intermediate member 830 defines an opening 850 through which the linear actuator 810-1 passes. The opening 850 limits a range of motion of the linear actuator 810-1 when the intermediate member 830 is rotated about the rotation axis. In some embodiments, the central structural member 805 comprises one or more stop features 840 that limit a range of rotation of the intermediate member 830 about the rotation axis.

The central structural member 805 comprising a central tube and projecting portions 865 that are each arranged to receive a pin 864. The pin 864 may contact the projecting portion 865 directly, or may contact intermediate spacer(s). The pin 864 also extends into openings 863 of the intermediate member 830, forming the joint J6 in which the rotation axis is a longitudinal axis 866 of the pin 864.

Openings 853 extend through the intermediate member 830 near a proximal end, and are dimensioned and arranged to receive a pin 852. The pin 852 may contact the intermediate member 830 directly, or may contact intermediate spacer(s). The pin 852 also extends through an opening 851 of the sleeve 835, forming the joint J5 in which the rotation axis is a longitudinal axis 854 of the pin 852.

Openings 855 extend through the intermediate member 830 near a distal end, and are dimensioned and arranged to receive a pin 856. The pin 856 may contact the intermediate member 830 directly, or may contact intermediate spacer(s). The pin 856 also extends through an opening 858 of the first link 820, forming the joint J2 in which the rotation axis is a longitudinal axis 857 of the pin 856.

Openings 859 extend through the first link 820 and are dimensioned and arranged to receive a pin 860. The pin 860 may contact the first link 820 directly, or may contact intermediate spacer(s). The pin 860 also extends through an opening 862 of the second link 825, forming the joint J3 in which the rotation axis is a longitudinal axis 861 of the pin 860.

FIGS. 9A-9D are views of an exemplary end effector having a rotatable structural assembly, according to various embodiments. The features illustrated in diagrams 900, 930, 990, 995 may be used in conjunction with other embodiments discussed herein, e.g., using one of the implementations of the linkage system depicted in FIGS. 5A-5E and FIGS. 8A-8C.

Figure 9A:
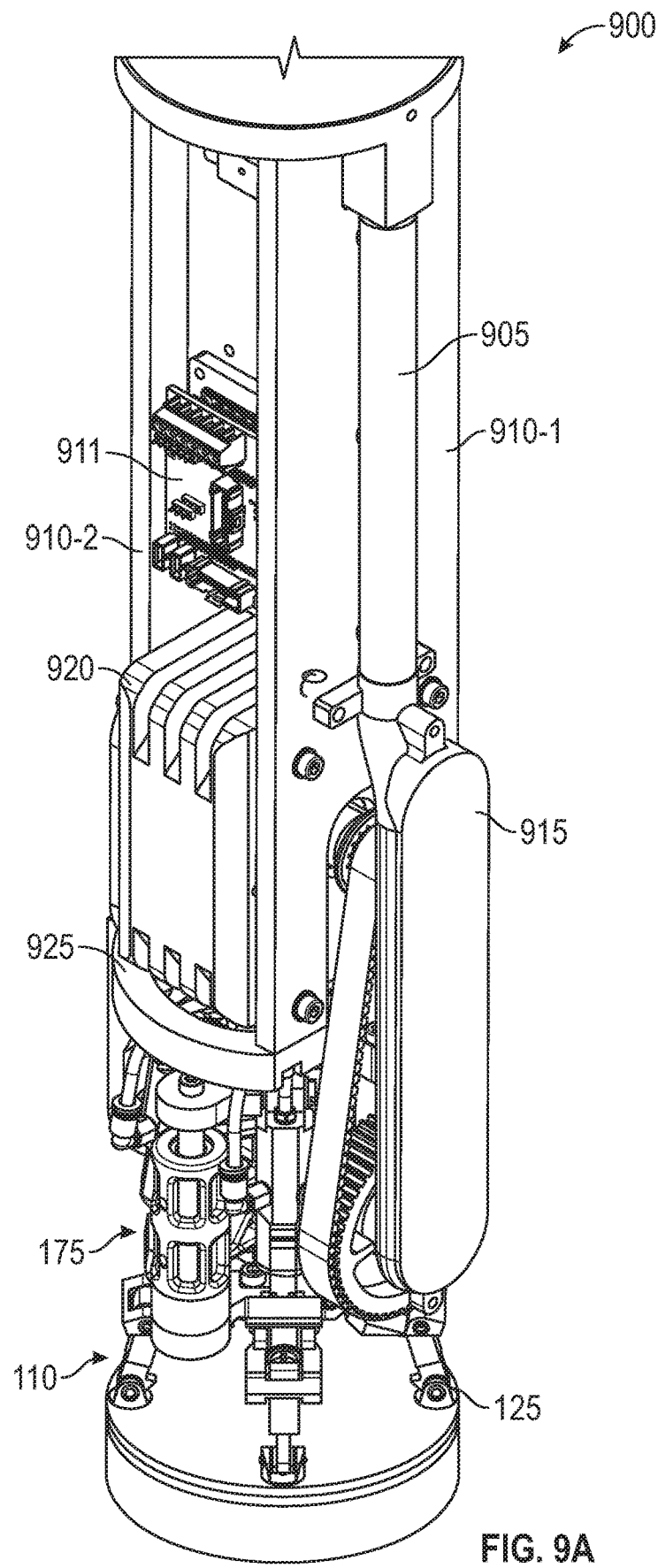
FIGS. 9A-9D are views of an exemplary end effector having a rotatable structural assembly, according to various embodiments.

Diagram 900 of FIG. 9A is an isometric view of the end effector, which comprises the linkage system 175 between a plurality of linear actuators and the interface system 110. The end effector further comprises a circuit board 911 arranged between sidewalls 910-1, 910-2 and a motor 920 arranged between, and mounted to, the sidewalls 910-1, 910-2. The circuit board 911 comprises circuitry that controls some or all of the functionality of the end effector. For example, the circuit board 911 may control operation of the motor 920 and/or the actuators connected to the linkage system 175.

The sidewalls 910-1, 910-2 are connected with a base 925. Although not illustrated, a housing may enclose the motor 920 and the sidewalls 910-1, 910-2, as well as other components of the end effector. The motor 920, which in some embodiments is connected with a belt drive, is configured to control an orientation of the end effector, e.g., to more closely match an orientation and/or a surface geometry of an item.

A tube 905 is mounted to a lateral surface of the sidewall 910-1 and extends along a longitudinal axis of the sidewall 910-1. In some embodiments, the tube 905 is in fluid communication with a vacuum source at a proximal end of the end effector, and with the inner recess of the pliable body member 125 at a distal end of the end effector. In some embodiments, the tube 905 connects with a tube 915 that is arranged laterally to, and is partly overlapping with, the belt drive. In some embodiments, the tube 915 is connected to an opening extending through a sprocket of the belt drive, and the inner recess and/or plurality of actuators are in fluid communication through the opening.

Figure 9B:
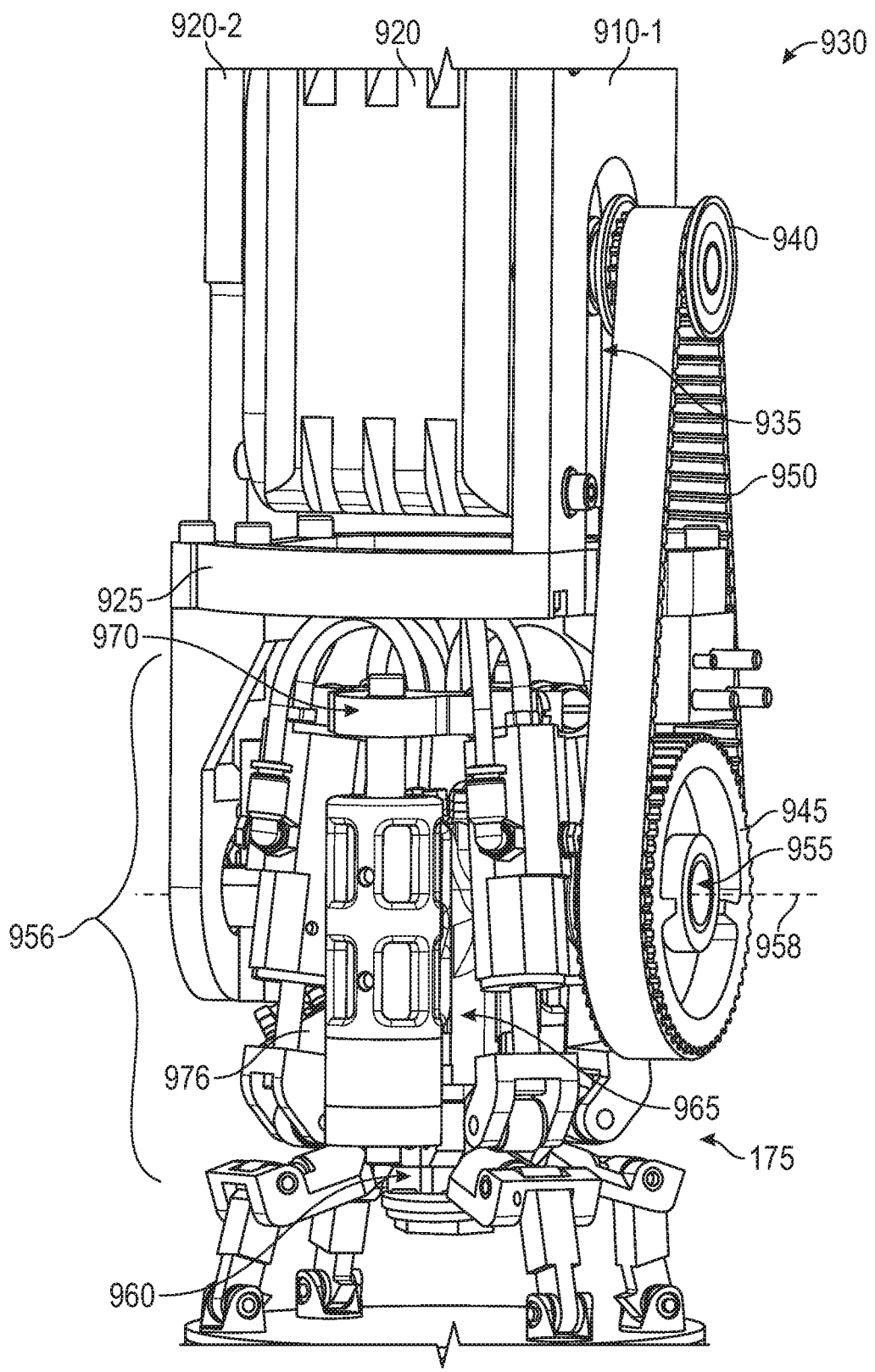
Figure 9C:
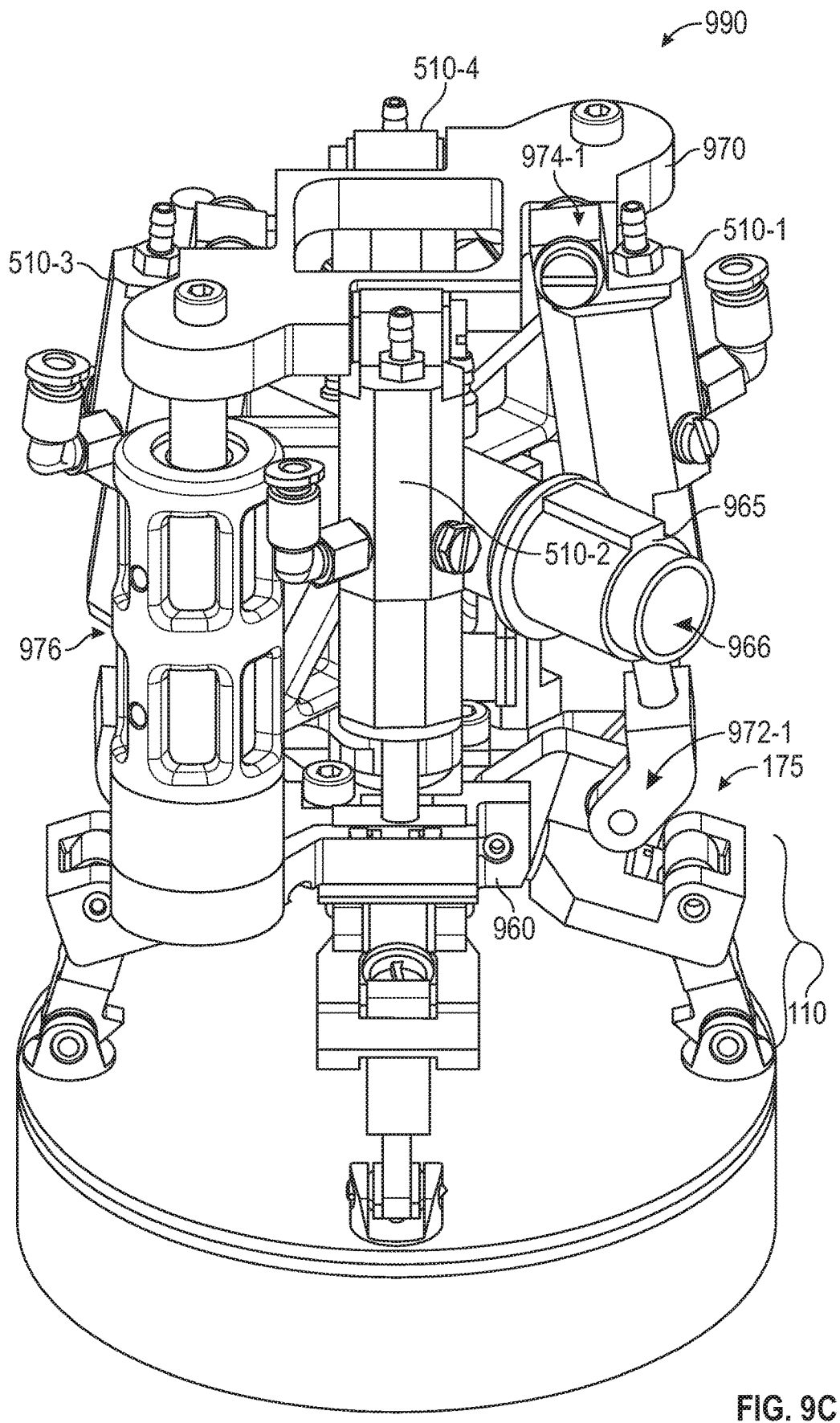

In diagrams 930, 990 of FIGS. 9B and 9C, a structural assembly 956 of the end effector comprises a central structural member 960 to which the linkage system 175 is connected, and a second central structural member 970 spaced apart from, and rigidly connected with, the central structural member 960. Each linear actuator of the plurality of linear actuators 510-1, 510-2, 510-3, 510-4 is connected with the second central structural member 970 at a respective second end 974-1 that is opposite the end 972-1 connected with the linkage system 175. The structural assembly 956 further comprises a third central structural member 965 connected with one or both of the central structural member 960 and the second central structural member 970.

The motor 920 is connected with a first sprocket 940 through an opening 935 of the sidewall 910-1, and a toothed belt 950 connects the first sprocket 940 with a second socket 945. The second socket 945 connects with the third central structural member 965 to enable rotation of the structural assembly 956 about a second rotation axis 958 extending through the third central structural member 965. In some embodiments, a vacuum port is in fluid communication with the inner recess of the pliable body member 125 through an opening 955 formed in the second socket, and through an opening 966 of the third central structural member 965.

Figure 9D:
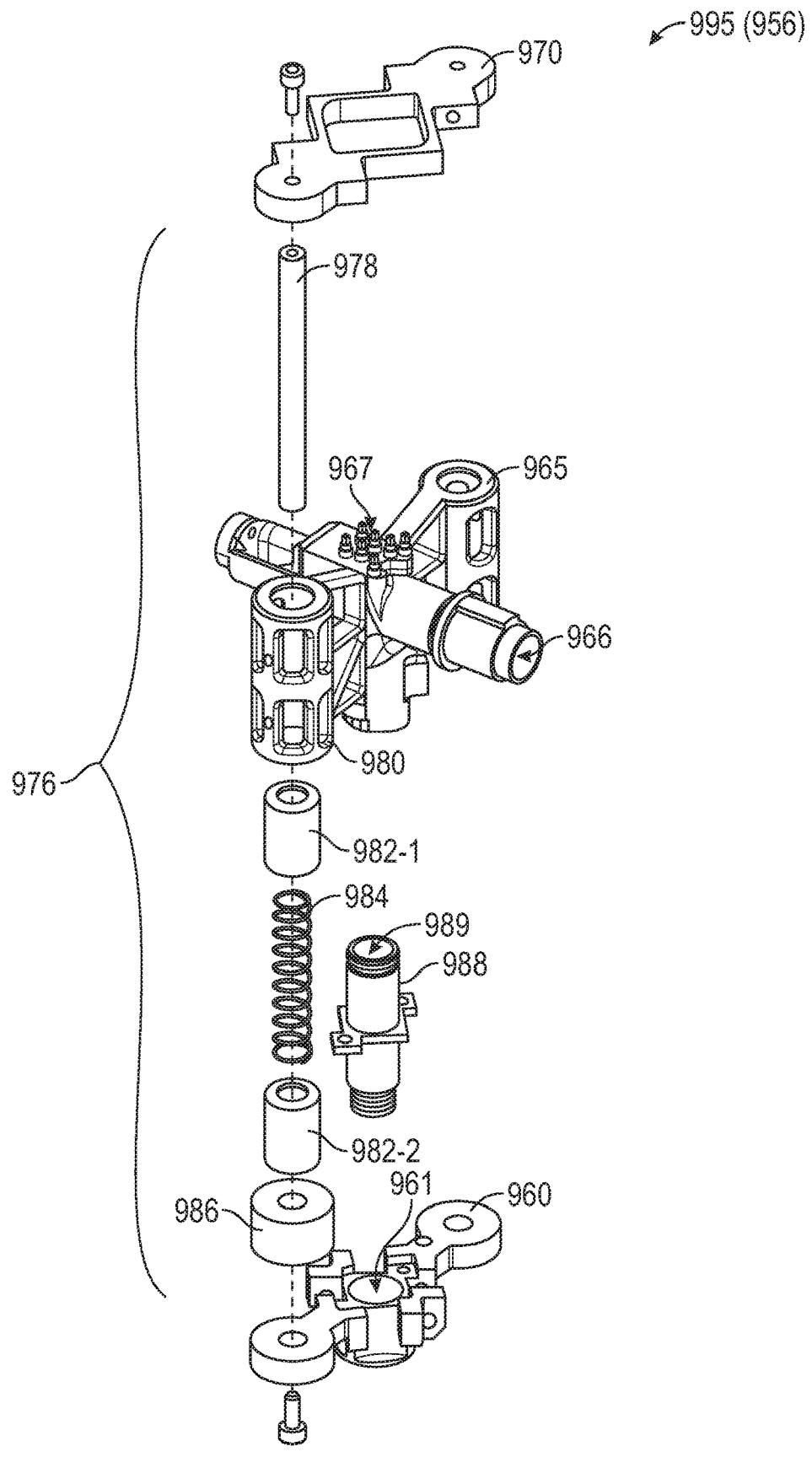

Diagram 995 of FIG. 9D provides a partially exploded view of the structural assembly 956. The second central structural member 970 is rigidly connected with the central structural member 960 by a tube 988 having an opening 989 extending therethrough, enabling fluid communication between the opening 966 of the third central structural member 965 and an opening 961 of the central structural member 960. In some embodiments, flexible tubing connects to a plurality of ports 967 of the third central structural member 965, enabling fluid communication between one or more compressed gas sources and the actuators through the third central structural member 965. The second central structural member 970 is further connected with the central structural member 960 by a compliance and return assembly 976 that enables motion of the central structural member 960 and the third central structural member 965 relative to the second central structural member 970, providing an improved compliance of the end effector in the vertical direction. The compliance and return assembly 976 comprises, for opposing sides of the central structural member 960 and the second central structural member 970, a cage 980 included in the third central structural member 965, tubular members 982-1, 982-2 (e.g., bushings) retained in the cage 980, a spring 984 arranged in the openings of the tubular members 982-1, 982-2 and compressed therebetween, and a rod 978 extending through the cage 980 and the spring 984. A spacer 986 is arranged between the cage 980 and the central structural member 960. The rod 978 is connected to the second central structural member 970 and to the central structural member 960 using, e.g., threaded fasteners.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An end effector capable of prehending items using impactive and astrictive forces, the end effector comprising:
  a central structural member arranged around a central axis of the end effector;
  a plurality of actuators;
  an interface system comprising:
    a deformable mounting plate; and
    a pliable body member attached to the mounting plate, the pliable body member having, at a distal end, a sealing surface configured to seal with items brought into proximity with the end effector, the pliable body member at least partially defining an inner recess;
  a vacuum port in fluid communication with the inner recess and arranged around the central axis; and
  a linkage system between the plurality of actuators and the interface system, the linkage system comprising, for each actuator of the plurality of actuators:
    a first link connected with:
      an end of the actuator at a first joint, the first joint at a first radial distance from the central axis; and
      the central structural member via a second joint, the second joint at a second radial distance less than the first radial distance; and
    a second link connected with:
      the first link at a third joint, the third joint at a third radial distance greater than the first radial distance; and
      a lateral portion of the mounting plate at a fourth joint, the fourth joint at a fourth radial distance greater than the third radial distance.

2. The end effector of claim 1, wherein the plurality of actuators comprises:
  a first pair of opposing linear actuators within a first plane; and
  a second pair of opposing linear actuators within a second plane orthogonal to the first plane.

3. The end effector of claim 1, wherein at least one component of the linkage system is rotatable about a rotation axis to cause the mounting plate to rotate about the central axis.

4. The end effector of claim 3, wherein the first link comprises:
  a first link component; and
  a second link component rotatable relative to the first link component.

5. The end effector of claim 3, wherein the linkage system further comprises, for each actuator of the plurality of actuators:
  an intermediate member connected with the first link at the second joint,
  wherein the intermediate member is rotatable relative to the central structural member.

6. A method of prehending an item using an end effector, the method comprising:
  bringing the item into proximity of a sealing surface at a distal end of a pliable body member;
  applying a suction force to an inner recess defined within the pliable body member, thereby causing the end effector to apply an astrictive force to the item; and
  applying, using a plurality of actuators connected with lateral portions of a deformable plate through a linkage system, at least a first force to deform the deformable plate and cause the end effector to apply an impactive force to the item.

7. The method of claim 6, wherein the end effector applies the impactive force to the item prior to applying the suction force to the inner recess.

8. The method of claim 6, further comprising:
  prior to contacting the item with the sealing surface, applying at least a second force using the plurality of actuators to deform the deformable plate and alter a geometry of the sealing surface.

9. The method of claim 6,
  wherein at least one component of the linkage system is rotatable about a rotation axis to cause the deformable plate to rotate about a central axis of the end effector, and
  wherein contacting the item with the sealing surface causes the at least one component to rotate such the sealing surface is more closely aligned with a geometry of the item.

10. The method of claim 6,
  wherein the plurality of actuators comprises linear actuators,
  wherein applying the first force comprises extending a first linear actuator of the plurality of actuators to apply the first force to a first joint of a first link,
  wherein applying the first force causes the first link to rotate about a second joint that connects the linkage system with a central structural member of the end effector, wherein rotating the first link about the second joint causes a second force to be applied to a third joint connecting the first link with a second link, and wherein applying the second force to the third joint causes a third force to be applied to a fourth joint connecting the second link with a first lateral portion of the lateral portions.

11. The method of claim 10,
wherein the first joint is at a first radial distance from a central axis of the end effector,
wherein the second joint is at a second radial distance less than the first radial distance,
wherein the third joint is at a third radial distance greater than the first radial distance, and
wherein the fourth joint is at a fourth radial distance greater than the third radial distance.

12. An end effector for prehending items, the end effector comprising:
a plurality of actuators;
an interface system comprising a deformable plate; and
a linkage system between the plurality of actuators and the interface system, the linkage system comprising, for each actuator of the plurality of actuators:
a first link connected with:
an end of the actuator at a first joint, the first joint at a first radial distance from a central axis of the end effector; and
a central structural member via a second joint, the second joint at a second radial distance less than the first radial distance; and
a second link connected with:
the first link at a third joint, the third joint at a third radial distance greater than the first radial distance; and
a lateral portion of the deformable plate at a fourth joint, the fourth joint at a fourth radial distance greater than the third radial distance,
wherein at least one component of the linkage system is rotatable about a rotation axis to cause the deformable plate to rotate about the central axis.

13. The end effector of claim 12,
wherein the plurality of actuators comprises linear actuators,
wherein extending at least two opposing linear actuators of the plurality of actuators causes the deformable plate to deform, and
wherein the deformable plate, when deformed, causes the end effector to apply an impactive force to an item.

14. The end effector of claim 13, wherein the interface system further comprises:
a pliable body member attached to the deformable plate and having a sealing surface at its distal end configured to seal with items brought into proximity with the end effector, the pliable body member at least partially defining an inner recess, and
wherein the end effector further comprises a vacuum port in fluid communication with the inner recess.

15. The end effector of claim 14, wherein the vacuum port is arranged around the central axis.

16. The end effector of claim 12, wherein the linkage system further comprises, for each actuator of the plurality of actuators:

an intermediate member connected with:
the first link at the second joint;
an exterior of the actuator via a fifth joint, the fifth joint at a fifth radial distance greater than the second radial distance; and
the central structural member via a sixth joint,
wherein the rotation axis is the rotation axis of the sixth joint.

17. The end effector of claim 16, wherein the fifth joint is at a sleeve arranged around the actuator, the sleeve configured to rotate about the actuator.

18. The end effector of claim 16, wherein the rotation axis of the sixth joint is substantially parallel to the central axis of the end effector.

19. The end effector of claim 16,
wherein each intermediate member defines an opening through which the respective actuator passes, and
wherein the opening limits a range of motion of the respective actuator when the intermediate member is rotated about the rotation axis.

20. The end effector of claim 16, wherein the central structural member comprises:
one or more stop features that limit a range of rotation of the intermediate member about the rotation axis.

21. The end effector of claim 12, wherein the first link comprises:
a first link component connected with:
the end of the actuator at the first joint; and
the central structural member at the second joint; and
a second link component connected with:
the second link at the third joint; and
the first link component at a fourth joint,
wherein the rotation axis is the rotation axis of the fourth joint.

22. The end effector of claim 12, wherein the central structural member is included in a structural assembly further comprising:
a second central structural member spaced apart from, and rigidly connected with, the central structural member, wherein each actuator of the plurality of actuators is connected with the second structural member at a respective second end that is opposite the end connected with the first link; and
a third central structural member connected with one of the central structural member and the second central structural member, wherein the structural assembly is rotatable about a second rotation axis extending through the third central structural member.

23. The end effector of claim 22, further comprising:
a first sprocket connected with a motor; and
a second sprocket connected with the first sprocket via a toothed belt, and with the third central structural member.

24. The end effector of claim 23, wherein an opening extends through the second sprocket, wherein the interface system further comprises:
a pliable body member attached to the deformable plate and having a sealing surface at its distal end configured to seal with items brought into proximity with the end effector, the pliable body member at least partially defining an inner recess, and
wherein the end effector further comprises a vacuum port in fluid communication with the inner recess through the opening and through the third central structural member.

* * * * *

UNITED STATES PATENT AND TRADEMARK OFFICE
CERTIFICATE OF CORRECTION

PATENT NO.         : 11,247,347 B2
APPLICATION NO.    : 16/799600
DATED              : February 15, 2022
INVENTOR(S)        : Parris S. Wellman et al.

Page 1 of 1

It is certified that error appears in the above-identified patent and that said Letters Patent is hereby corrected as shown below:

In the Claims

In Column 20, Lines 55-56, in Claim 9, delete "to rotate such the sealing surface" and insert -- to rotate such that the sealing surface --.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*